Figure 1:
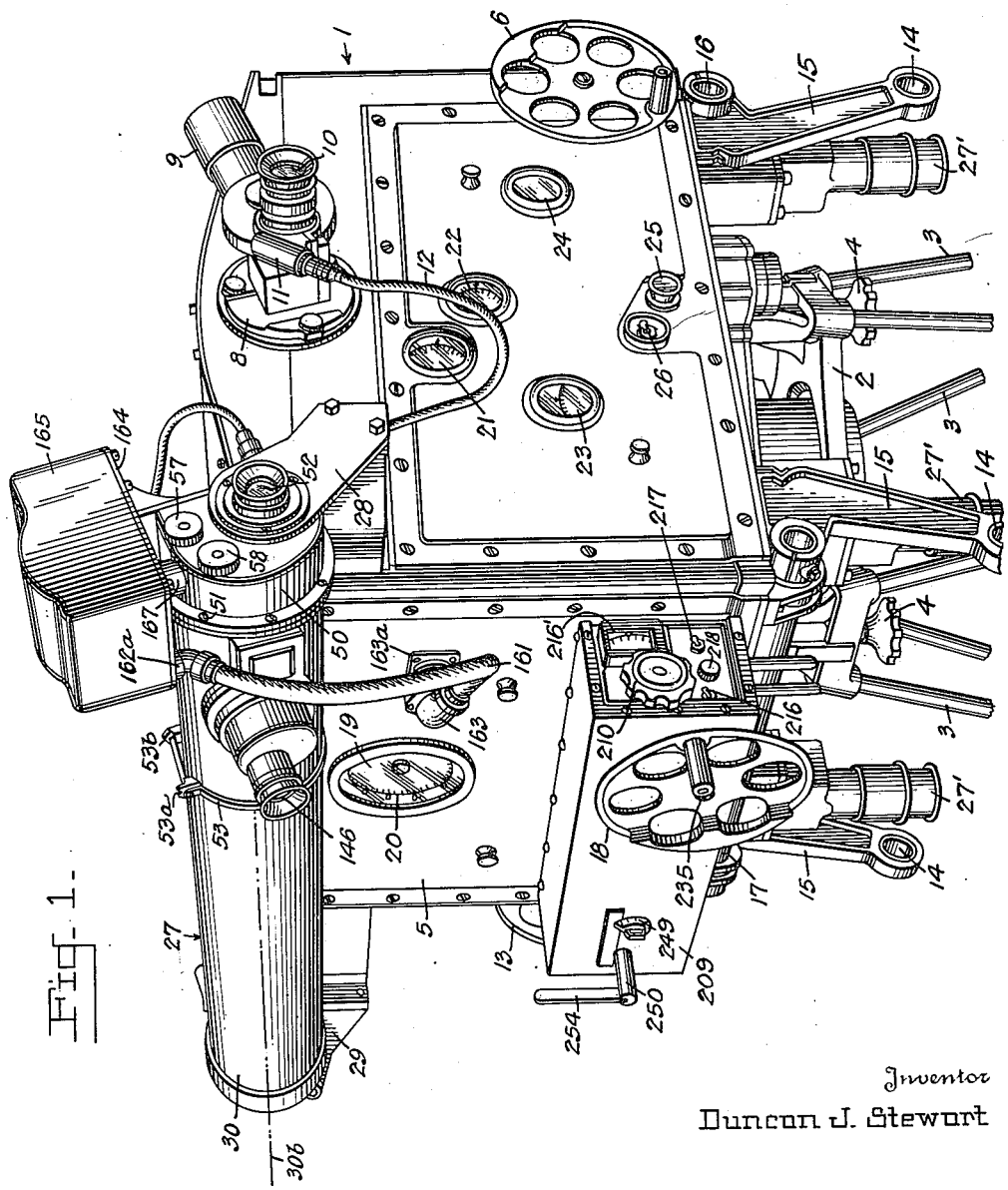

April 17, 1951  D. J. STEWART  2,549,030
GUN FIRE DIRECTOR

Filed Aug. 22, 1947  11 Sheets-Sheet 1

Inventor
Duncan J. Stewart

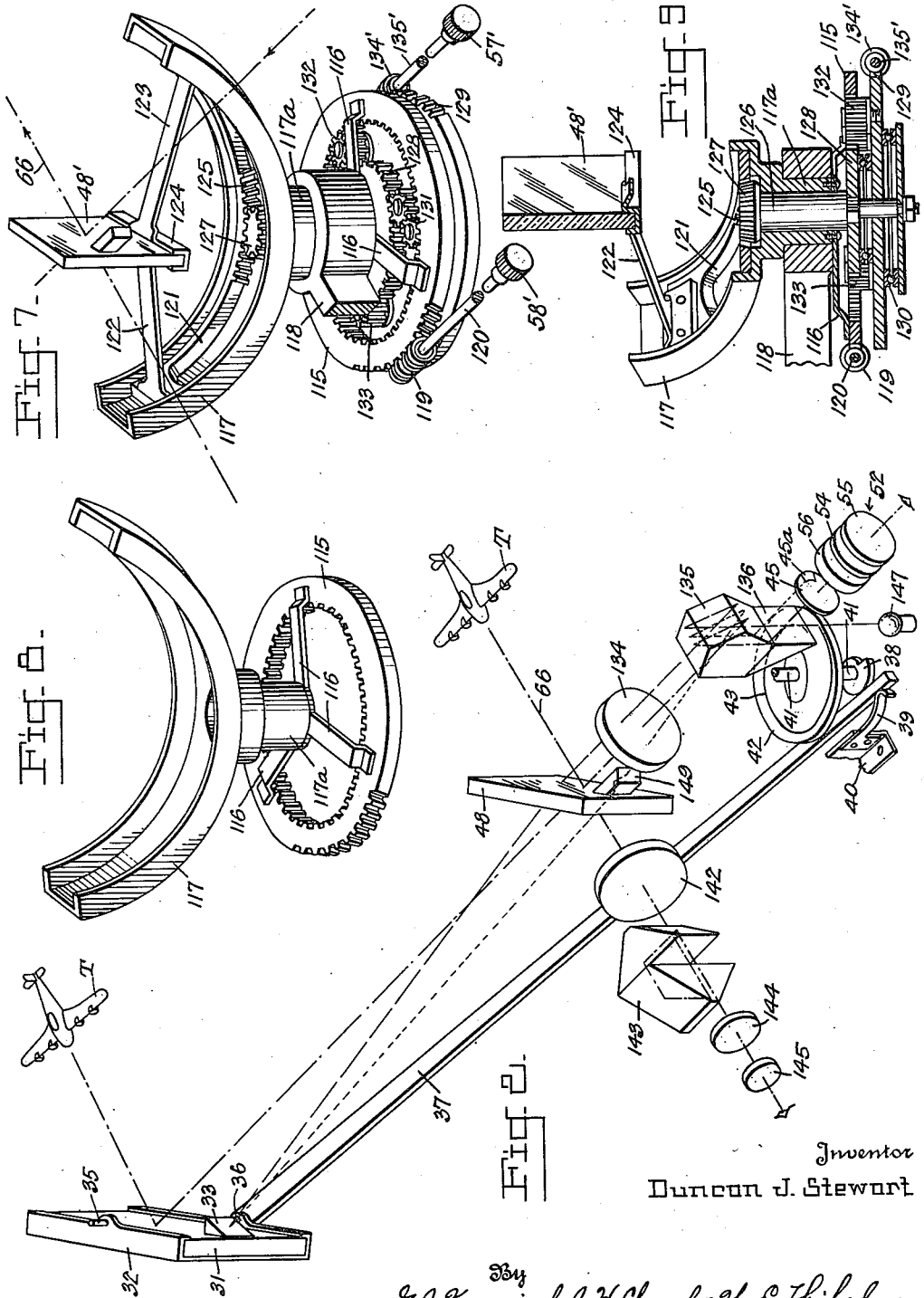

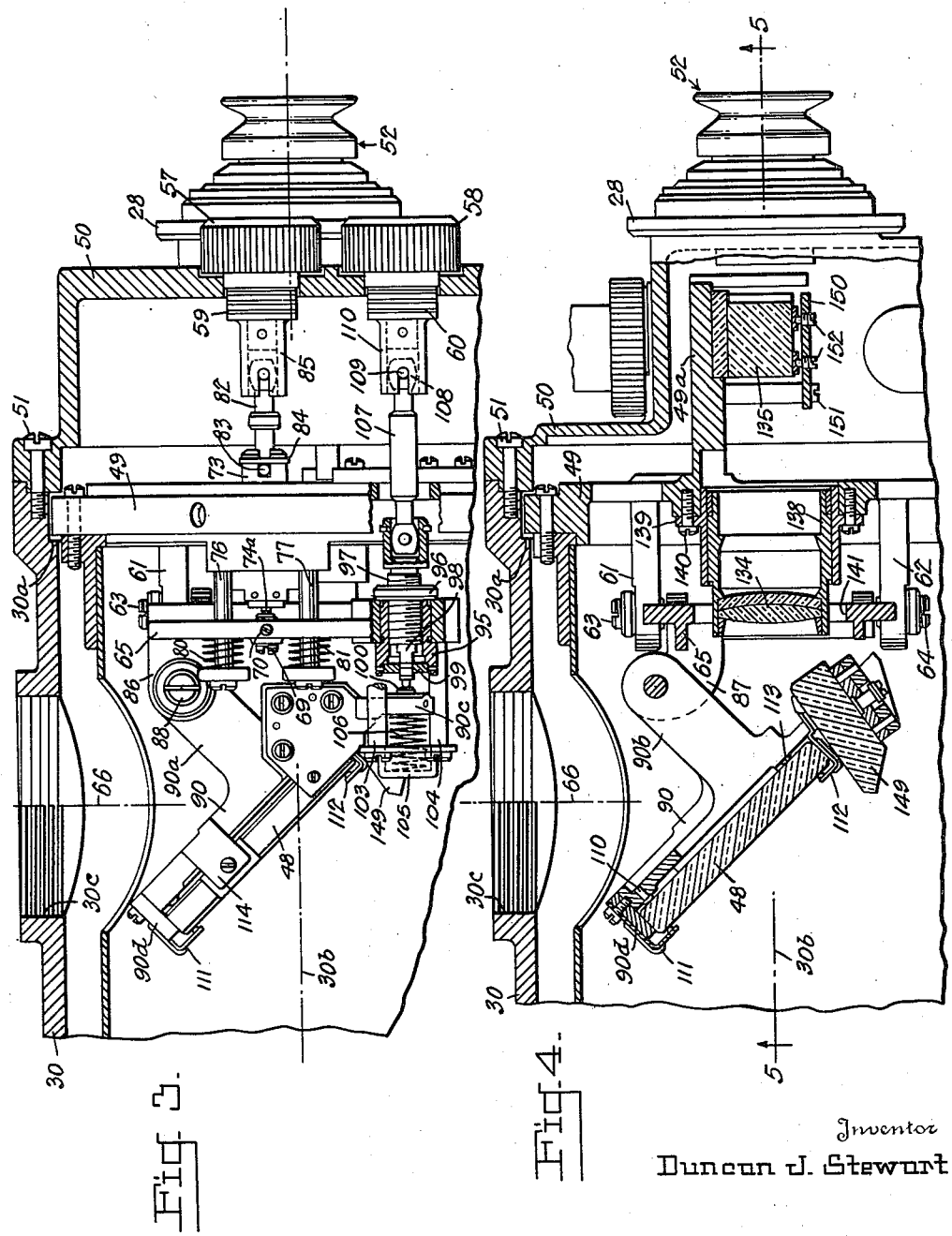

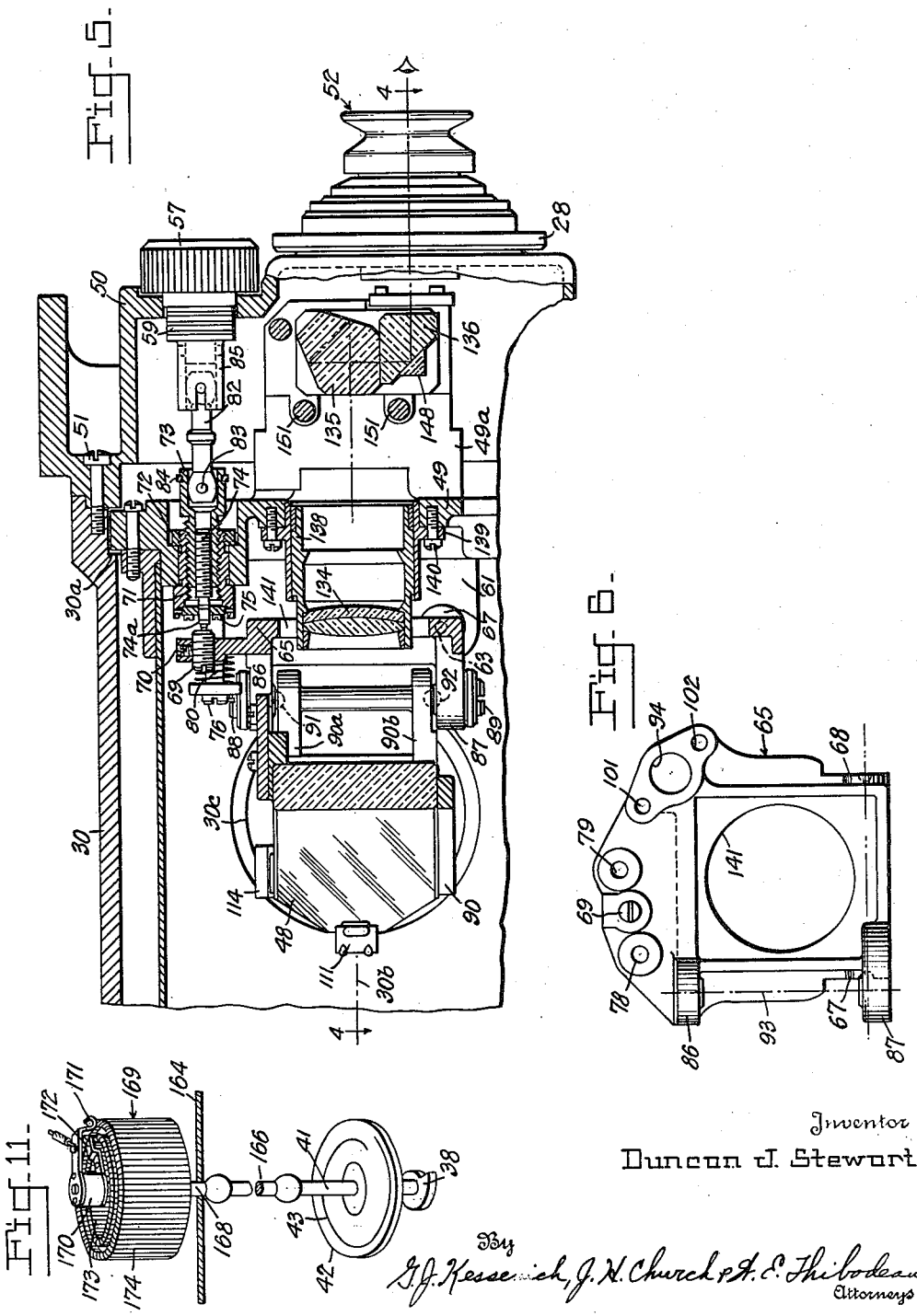

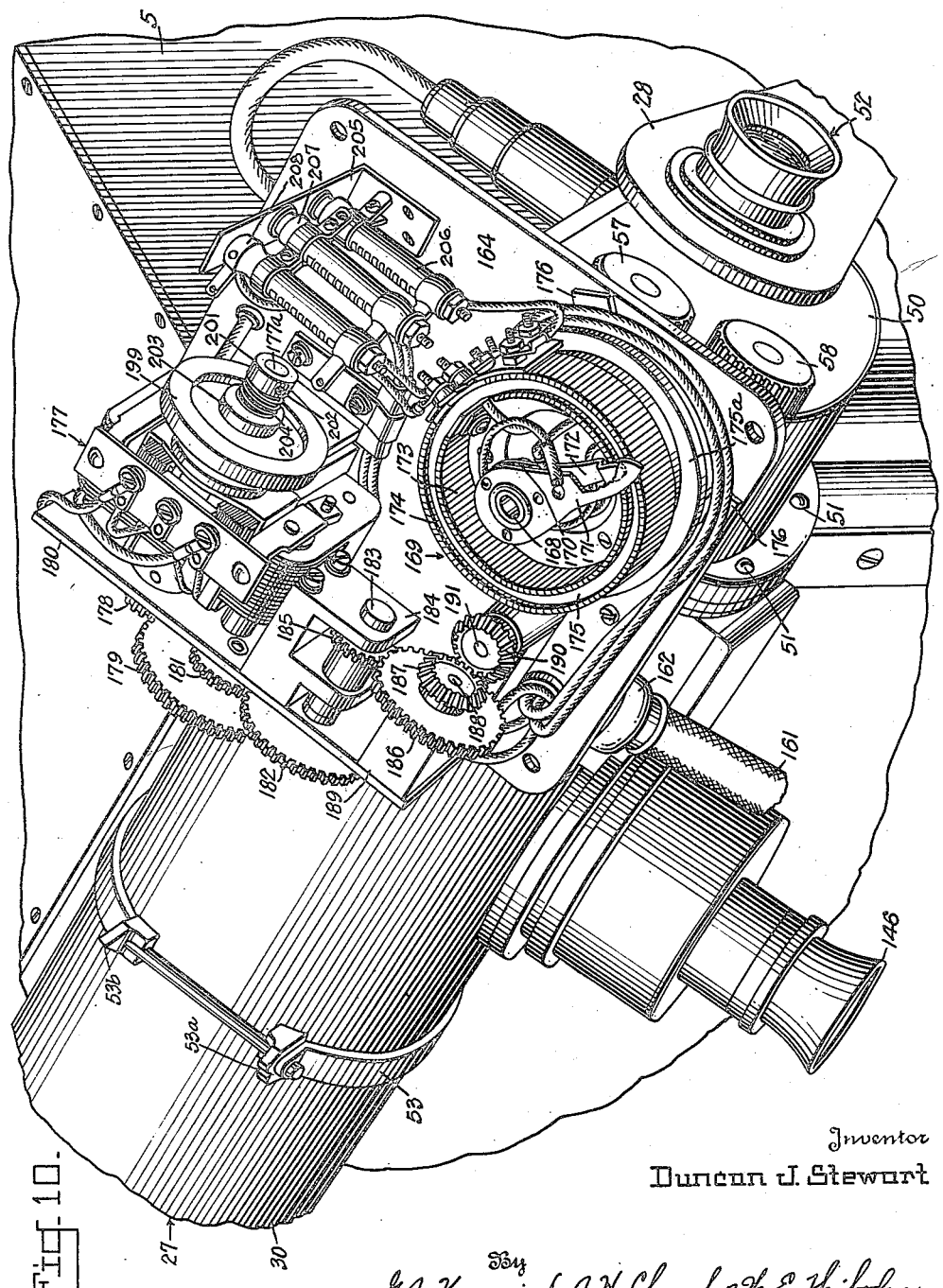

April 17, 1951     D. J. STEWART     2,549,030
GUN FIRE DIRECTOR
Filed Aug. 22, 1947     11 Sheets-Sheet 6
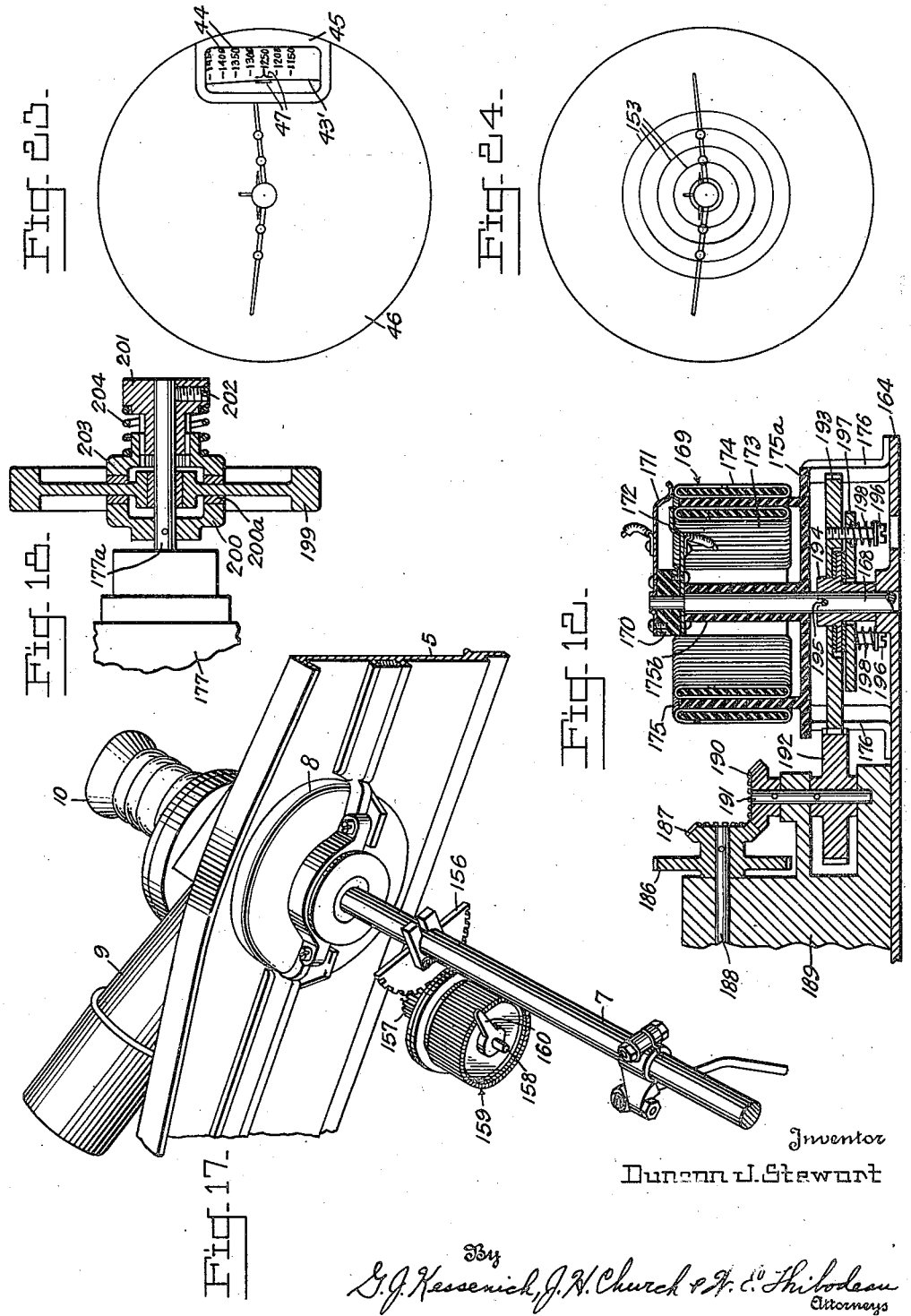
Inventor
Duncan J. Stewart

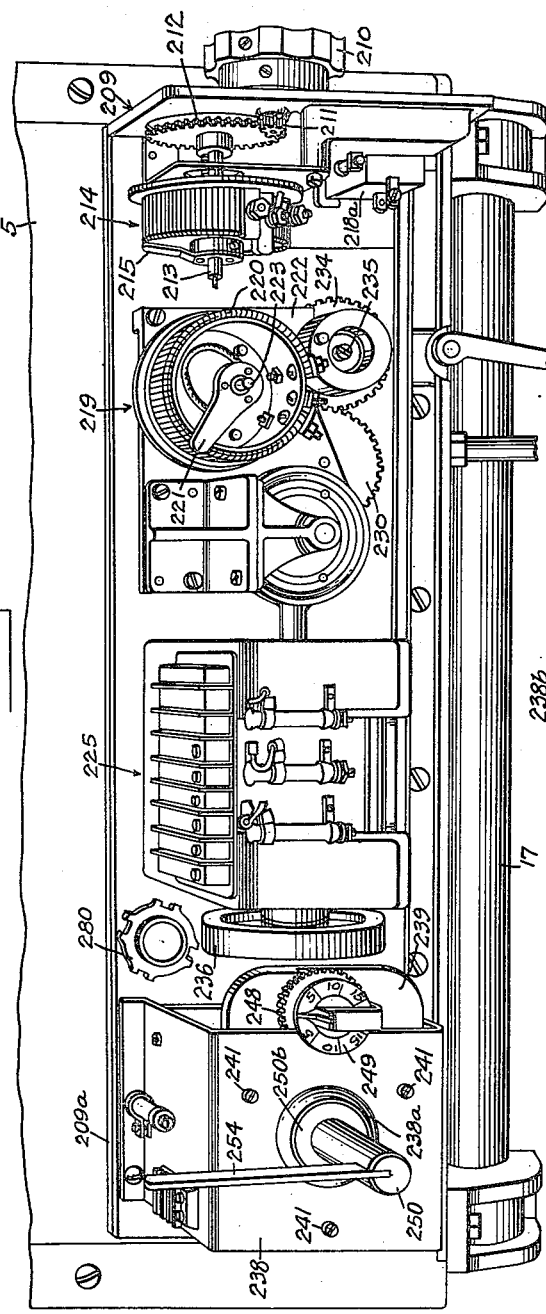

April 17, 1951  D. J. STEWART  2,549,030
GUN FIRE DIRECTOR
Filed Aug. 22, 1947  11 Sheets-Sheet 8

Inventor
Duncan J. Stewart
By
G. J. Kessenich, J. H. Church & N. E. Thibodeau
Attorneys

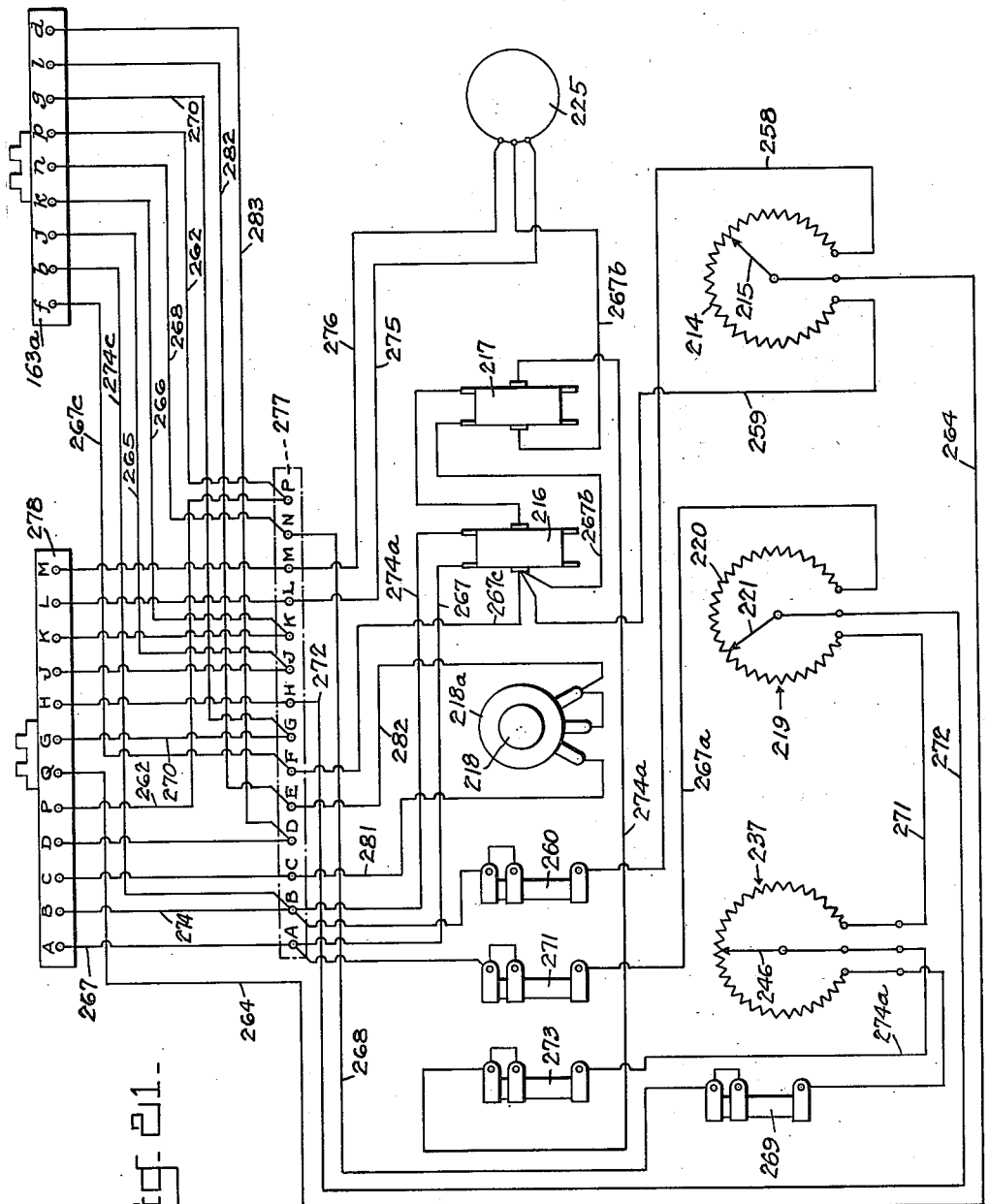

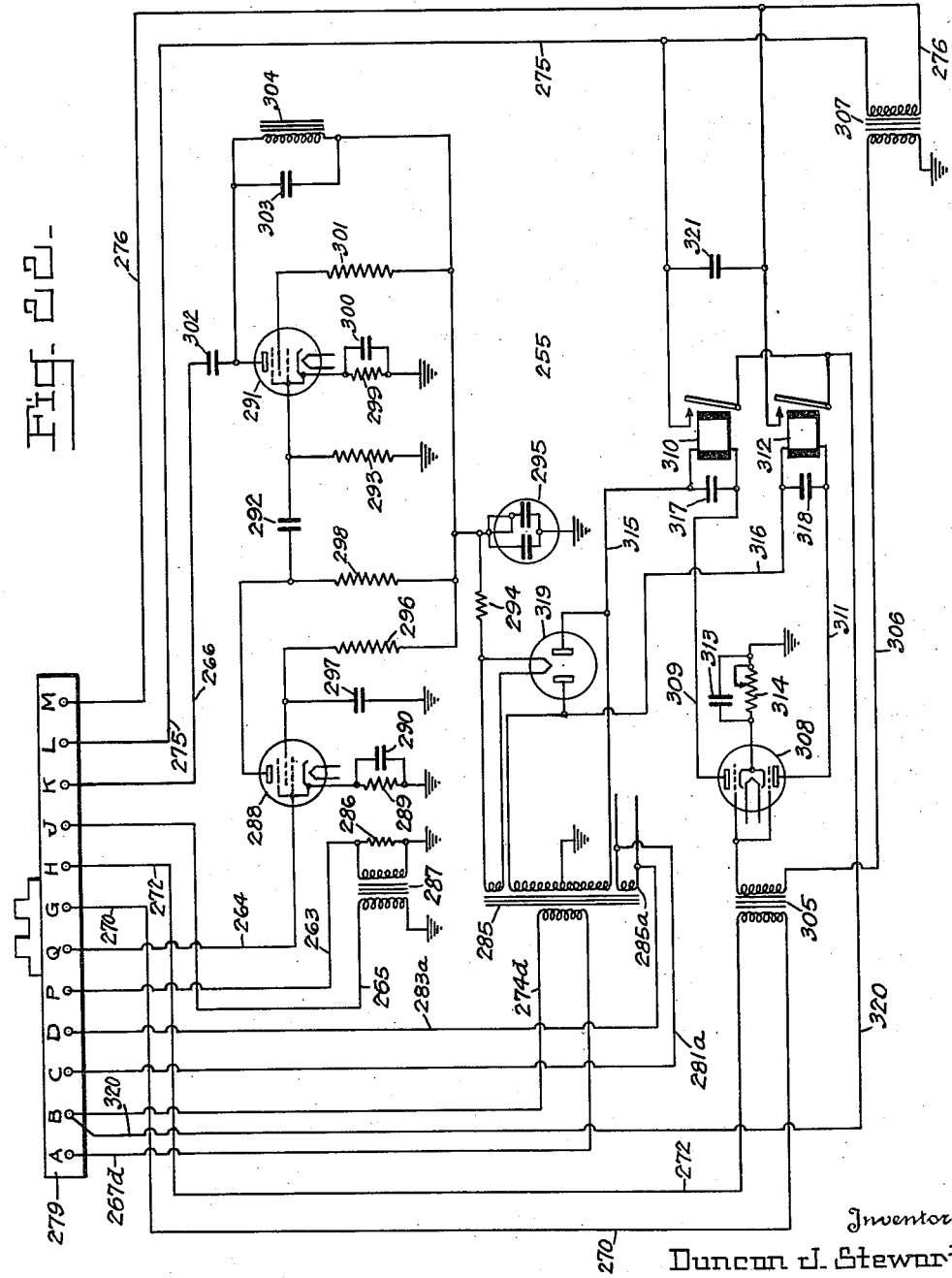

April 17, 1951 D. J. STEWART 2,549,030
GUN FIRE DIRECTOR
Filed Aug. 22, 1947 11 Sheets-Sheet 11

Inventor
Duncan J. Stewart
By
G. J. Kessenich, J. H. Church & W. E. Thibodeau
Attorneys Patented Apr. 17, 1951

2,549,030

UNITED STATES PATENT OFFICE 2,549,030

GUNFIRE DIRECTOR

Duncan J. Stewart, Rockford, Ill., assignor to the United States of America as represented by the Secretary of War Application August 22, 1947, Serial No. 770,114

12 Claims. (Cl. 88—1)

This invention relates to an improvement in gun fire directors, and more particularly, to directors intended for determining and controlling the fire of intermediate calibre guns against moving targets, such as aircraft. In firing at rapidly moving targets, such as aircraft, the gun must be aimed so that its trajectory passes through a point lying upon the forwardly-extended path of the target. The exact point is determined by the distance which the target travels along said path from the time the gun is fired until the projectile reaches the point of impact. In other words, the angle by which the gun must lead the target is that angle subtended at the gun, by a distance extended forwardly along the target path, equal to the product of speed of target (assumed to remain constant), and the time of flight of the projectile. The lead angle thus obviously depends on target speed, target course and range, in addition to numerous other well-known variables such as windage and type of ammunition. Of course, superelevation must be added to the vertical component of lead to determine the correct angle of gun elevation.

The purpose of all directors is to determine, inter alia, the aforementioned lead angle or, rather, its vertical and horizontal components and to algebraically add other component angles so that the gun, when aimed in accordance with the outputs of angular values of the director, will be continuously properly aimed to hit the target. Such directors are well known; and while the invention may be used in connection with numerous kinds and types of directors, it will be described in connection with the Army's types M5, M5A1, or M6. In a typical installation, the director and gun are electrically connected so that after initial adjustment, the director as it is moved to maintain its line of sight upon the target, supplies electrical impulses to the gun in accordance with the computed lead angles. These impulses are utilized to control power drives at the gun which automatically move the gun in train and elevation to continuously maintain it properly laid. Since range is an indispensable input value, it must be estimated or determined. Previously, it was customary for the range to be manually set into the instrument on the basis of estimation, or the reading of a separate range finder. In all cases the initial range setting is subsequently modified by spotters corrections, based upon observation of tracers. Because of the extremely high speeds of modern aircraft and the errors inherent in unaided observation at long ranges, the prior art procedures have become obsolescent even for ammunition using proximity or variable time fuses.

Accordingly, it is an object of my invention to provide a director having a range finder thereon and trainable as a unit therewith.

Another object is to provide the combination of a director and coupled range finder wherein manual adjustments of the range finder to focus the same upon a target, automatically introduces the range of the target into the director.

Another object is to provide a range finder in which the altitude, rather than the range, is set, the instrument automatically operating to combine altitude and angle of elevation of the line of sight to determine range.

A still further object is to provide a servo mechanism automatically controlled by the range finder for setting range into the director.

A further object is to provide a novel range finder, preferably of the full field superposed image type and having two separate oculars whereby simultaneous observations may be made by the operator and a spotter or tracer observer.

Pursuant to the immediately foregoing object, an auxiliary object is to provide a range finder having a novel mount for one entrance reflector whereby said reflector may be independently adjusted about each of two mutually normal axes to properly calibrate and adjust the instrument.

A still further object is to provide a reflector mount for a range finder in which adjustment of the reflector is about two mutually normal concurrent axes, one parallel with the line of sight determined thereby and the other normal to said line of sight and the axis of the instrument.

A further object is to provide a combined gunfire director and a range finder wherein the range set into the director may be manually modified on the basis of tracer observations made through the range finder.

A still further object is to provide novel potential-balancing and follow-up control circuits whereby the range setting of the director is effected in a smooth and continuous manner and with substantially instantaneous response.

Still another object is the provision of a novel method of determining range and altitude of an object.

Other objects and advantages of the invention will become apparent as the description proceeds.

In the drawings:

Figure 1 is a perspective view looking toward the right rear corner, of a director and range finder embodying the invention and showing, inter alia, the azimuth tracker's telescope and hand-wheel, the range finder, range servo control box, and range finder control box, Figure 2 is a perspective diagrammatic view of the optical elements of the range finder, the range cam and disc unit, together with the mechanical connection between the cam and the adjustable reflector, Figure 3 is a longitudinal section of the right end of the range finder tube taken in a plane parallel to a plane through the lines of sight and showing in plan the adjacent mirror, its pivotal mounting and the means for effecting adjustment thereof about a first axis normal to the central axis of the range finder tube and the line of sight, and a second axis parallel with the line of sight, Figure 4 is a sectional detail view taken upon a plane indicated by the line 4—4, Figure 5, and showing details of the mirror and its mounting, Figure 5 is a sectional detail view taken upon a plane indicated generally by the line 5—5, Figure 4, showing the mechanism for effecting the height adjustment of the adjacent mirror, Figure 6 is an end elevation of the mounting frame for the mirror, Figure 7 is a perspective view of an alternative form of mirror-mounting and adjusting mechanism, Figure 8 is a detail perspective view of the mounting sector and gear of the unit shown in Figure 7, Figure 9 is a vertical axial section of the unit of Figure 7 taken in a plane through the line of sight.

Figure 19:
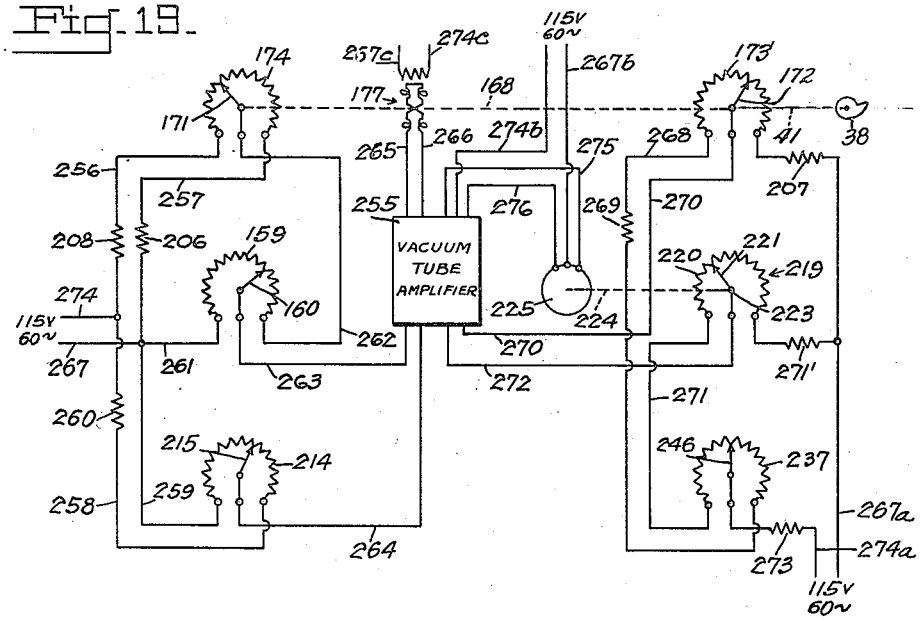
Figure 20:
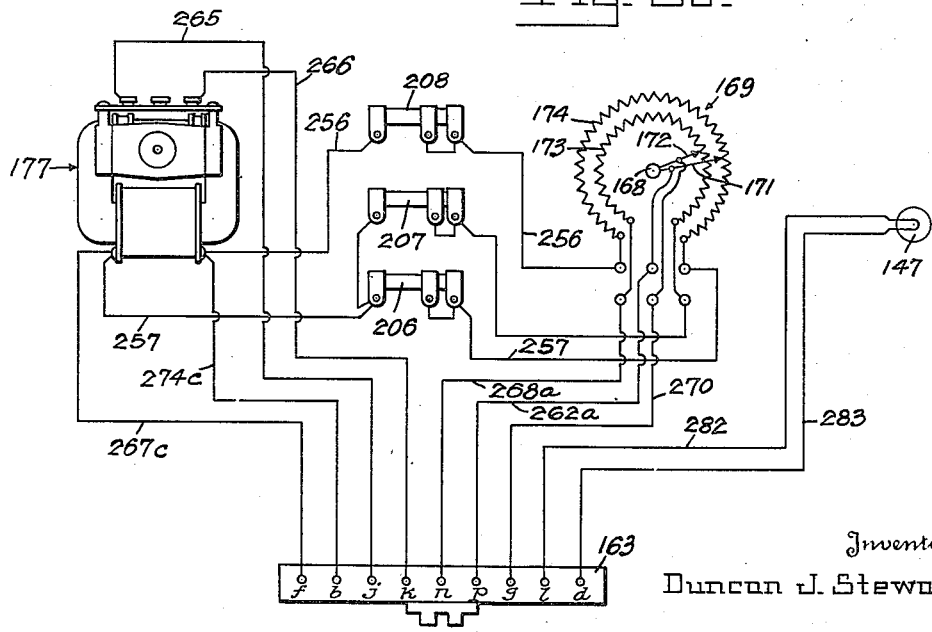

Figure 10 is a perspective view of that portion of the altitude converter mounted upon the range finder and having its cover removed to show details of construction, Figure 11 is a schematic detail view showing the mechanical coupling between the range cam and the slider of the slant range potentiometer, Figure 12 is a section through the axis of the slant range potentiometer of Figure 10, showing the final portion of the power drive thereto, Figure 13 is a rear perspective, with cover removed, of the range servo and control mechanism carried on the rear wall of the director, Figure 14 is a detail axial section of the range adjustment potentiometer appearing in Figure 13, Figure 15 is a section on a plane indicated by the line 15—15, Figure 14, showing the means for urging the spotter's range adjustment handle and potentiometer handle, to central or initial position, Figure 16 is a horizontal section through the pivot axis of the range servo potentiometer of Figure 13, showing the details of the driving connection between the potentiometer and the range servomotor, Figure 17 is a detail perspective view of the right hand end of the director sight shaft showing the azimuth telescope and the mechanical connection between the sight shaft and the "sine E" potentiometer, Figure 18 is an axial section showing in detail the friction anti-hunting coupling between the shaft of the range finder motor and its flywheel, Figure 19 is a simplified wiring diagram of the several potentiometers, and their connections to each other and the servo motors through the amplifier, Figure 20 is a complete wiring diagram of the altitude converter parts mounted upon the range finder, Figure 21 is a complete wiring diagram of the range servo mechanism on the director and its connections to the altitude converter parts on the range finder and the amplifier in the director, Figure 22 is a complete wiring diagram of the amplifier and its connections with the range servo and altitude converter, Figure 23 is a view showing the field of view of the range finder operator when the range finder is properly adjusted and focused upon a target, Figure 24 is the view corresponding to Figure 23 as seen by the tracer observer in his eyepiece on the range finder, and Figures 25 to 30, inclusive, are typical views as seen by the tracer observer in his field of view during combat.

The director in general

In order to fully and adequately disclose the invention, it has been shown, merely by way of example, as a part of an M5 Army director. This director is generally identified by the numeral 1 and is supported by a tripod consisting of legs 3 surmounted by a head 2. Three leveling knobs 4, are journaled on head 2 at the ends of equal, and equally spaced radii about the central axis of the head. Each knob controls the vertical adjustment of a respective, upwardly-projecting plunger, not shown. Each plunger fits a corresponding socket in the base of the director, whereby the director 1 may be leveled in a well-known manner. The main portion of the director including casing 5, is journaled for movement about a normally vertical axis relatively to the aforementioned base. Azimuth handwheel 6 is journaled in casing 5 and is geared to base so that rotation of the handwheel effects movement in azimuth of the casing and all parts carried thereby.

A sight shaft 7, Figure 17, is journaled at its ends in casing 5, as by means of bearings, one of which is identified at 8. The shaft is normally horizontal. An azimuth elbow telescope 9 having an ocular 10 is adapted to be fixed to the right projecting end of shaft 7 and has a reticle in the field of view comprising vertical and horizontal intersecting lines. This reticle may be illuminated by a lamp in housing 11, supplied by current over a cable 12. The tripod legs 3 are of a height such that ocular 10 is substantially at eye level. In operation, the azimuth tracker or trainer stands with an eye at ocular 10 and by manipulation of handwheel 6, trains the entire casing 5 about the vertical axis to keep the vertical reticle line in his telescope on the target.

A second or elevation tracker's telescope (not shown) is fixed to the left projecting end of shaft 7. This telescope may be a duplicate of 9. A handwheel 13, Figure 1, is journaled on casing 5 and geared by means, not shown, so that rotation thereof, moves shaft 7 in its bearings 8 and changes the elevation angle of the line of sight. The lines of sight of the two telescopes are, of course, parallel. Thus, in operation, the elevation tracker, or pointer, looks into his telescope and manipulates his handwheel 13 to rotate shaft 7 and keep the horizontal cross hair of his telescope on the target. The director base rests on the upwardly-projecting ends of plungers controlled by knobs 4 and is manually positioned on the tripod and removed therefrom, by front and rear porter bars each passing through an aperture 14 in the ends of carrying brackets 15. The front pair of brackets are fixed to a shaft 16 journaled on the front lower surface of casing 5. Likewise, the rear pair of brackets are fixed to a shaft 17 journaled on the rear lower surface of the casing. Electrical connections to and from the director are made by a multi-pole D-plug insertable upwardly into a receptacle in the lower portion of the instrument.

While it is one function of the present invention to automatically introduce range into the director under control of the range finder, as will be subsequently explained, range may be manually introduced by hand wheel 18, as in prior Army models. Whether range is introduced manually or automatically, the instantaneous range being set into the instrument, is indicated by a dial 19 rotatable within an opening 20 in the rear wall of casing 5. Additional features common to the aforementioned models are identified as coarse firing azimuth dial 21, fine azimuth firing dial 22, constant speed gear observation window 23, zero deflection mark observation window 24, rate setting clutch control 25 and switch 26. Numerals 27' identify spring buffers projecting from the lower surface of casing 5 and by which the entire instrument is resiliently supported and protected against shock when in its packing case.

The director, as thus briefly described is standard Army equipment, and, per se, forms no part of my invention. The director is, in effect, a computer wherein certain input values such as present azimuth and azimuth rate of the target, present elevation and elevation rate, and range of target, are introduced. The director takes these values, properly combines them, and from them computes and supplies output values including a value of quadrant angle of gun elevation and train angle measured from a predetermined horizontal base line, through which the gun must be elevated and trained in order to hit the target being tracked. These values may be transmitted to the gun by conventional electric telemetric connections where they are utilized either to directly control the gun through follow-up and servo-motor controls, or used to effect indications for manually actuated follow-the-pointer control. The directors, as just described, require a crew of three men, namely an azimuth tracker, an elevation tracker and a range setter. In these prior instruments, range may be obtained from a separate range finder or the range setter may estimate the initial range and make subsequent corrections on the basis of the observed tracer paths.

*The range finder in general*

Because of the errors introduced by the inherent limitations of unaided stereoscopic vision at long ranges, I have provided a director having a range finder 27 mounted upon the director casing and moving in azimuth as a unit therewith and in elevation about its longitudinal axis, in synchronism with the telescopes, including azimuth telescope 9.

The range finder is shown as a 30-inch base, full field, superposed image type of instrument mounted in anti-friction bearings for pivotal movement about its longitudinal axis in brackets 8 and 29. These brackets are bolted to the right and left sides, respectively, of casing 5, at the rear upper corners thereof. The finder tube 0 is thus journaled for rotation about its longitudinal axis, which axis is fixed parallel with shaft 7. The lines of sight of the elevation and azimuth telescopes must be kept parallel with those of the range finder. This function may be performed by any suitable mechanism, connecting shaft 7 and tube 30 for equal pivotal movement in synchronism. One satisfactory way is by the use of a parallelogram linkage comprising parallel lever arms of equal effective length connected to shaft 7 and tube 30, respectively, and having their radially outer ends connected by a link equal in effective length, to the distance between the axes of the shaft 7 and tube 30, as will be understood by those skilled in the art. A clamp such as 53, Figures 1 and 10, may be used to provide an open sight on the range finder, the line of sight being determined by a rear notch 53a and a forward point 53b. The line so determined is, of course, parallel to that of the range finder, whereby the target may be picked up without loss of time.

*The entrance reflector mounts of the range finder*

The optical elements of the range finder are shown at Figure 2, where 31 identifies the left entrance total reflector or mirror, mounted in a frame 32 and provided with aligned trunnions 35 and 36 for movement in casing 30 about the axis defined by said trunnions. This axis lies in the reflecting surface of the mirror and is normal to the longitudinal axis of the finder. At its inner side, mirror 31 carries a small prism-shaped element 33 having a plane silvered reflecting surface generally normal to the longitudinal axis 30b of the tube or casing 30. Frame 32 has a lever 37 connected thereto. This lever extends axially along the casing where its right end is held in contact with an equi-crescent cam 38 by a leaf spring 39 fixed at one end to a portion 40 of the range finder frame.

Cam 38 is fixed to a shaft 41 journaled in the casing on an axis normal both to axis 30b and the line of sight to the target. This shaft also has fixed thereto a transparent disc 42 having scribed thereon a spiral range line 43, and a range scale 44 shown at Figure 23. The reflections of this range line and scale appear within masked outlines 45 of reticle disc 46 (Fig. 23) where the instrument is shown properly adjusted for range, with image 43' of line 43 centered between two parallel fiducial lines 47 etched on reticle 46. The range is indicated as 1250 yards in the figure.

The inner reflector 48 is a partially silvered mirror mounted, by means now to be described, for movement about two mutually normal axes, namely, a first axis normal to the axis 30b of the tube 30 and a second axis normal to the line of sight to the target. Referring to Figures 3 to 6, inclusive, it will be noted that the ocular end of casing 30, is rabbetted as at 30a to receive a frame 49. This frame may be held in place by a flanged end cap 50 secured to the end of tube 30 by screws 51. Cap 50 is formed to support the range finding ocular, generally identified by numeral 52. See also Figure 10. The ocular may be a standard Erfle so that it is deemed sufficient merely to identify, on Figure 2, first and second eye lens 54 and 55, and field lens 56. The cap also has bearing support apertures for a pair of adjustment knobs 57 and 58 which are operable by the range finder operator, to adjust mirror 48 about its two axes, as subsequently explained. Sets of slip friction discs 59 and 60 connect each knob with its driven parts and act to prevent damage to those parts which might otherwise be effected by excessive torques applied to the knobs, as for example, when the parts have reached their limits of movement.

Frame 49 is formed to provide a pair of arms 61 and 62, Figure 4, projecting axially of tube 30 on the side adjacent mirror 48 and at the lower side of said axis. These arms have aligned apertures at their ends defining an axis parallel to the adjacent line of sight 66 of the range finder. The apertures are threaded to receive bearing screws 63 and 64, socketed at their inner or confronting ends to journal therebetween, a support 65 for pivotal movement about said axis. Mounting is conveniently and accurately effected by a pair of steel balls, each seated in conical or hemispherical depressions in lugs 67 and 68, Figure 6, and in the aforesaid bearing pins. At its top portion, on the side of axis 30b of tube 30 remote from arms 61 and 62, support 65 has an aperture in which a contact pin 69 is threaded, Figure 5. This pin is adapted to be locked in adjusted position by a set screw 70 and extends generally parallel with axis 30b. Frame 49 has a splined aperture in alignment with pin 69 in which fits an internally threaded and correspondingly splined bushing 71. The bushing is shouldered at its inner end and is held firmly in position in frame 49 by a nut 72 threaded upon its outer end. The inner or headed end of bushing 71 is recessed to fixedly receive a small plate 75 having a squared central opening in alignment with pin 69. A sleeve 73 is externally threaded to engage the internal threads of bushing 71, and internally threaded to receive a threaded contact plunger 74. This plunger has a squared reduced forward end 74a fitting the squared aperture in plate 75. The threads between bushing 71 and sleeve 73 are of a different pitch than those between sleeve 73 and plunger 74 so that, as the sleeve is turned, plunger 74 is advanced or retracted in pure translation to effect a very fine pivotal movement of support 65 about its pivot axis, previously described. From Figure 3, it will be noted that a pair of pins 76 and 77 are fixed in frame 49 and project loosely through respective holes 78 and 79 in support 65. These pins have headed ends and light coil springs 80 and 81 surround the respective pins and exert light thrusts between the heads and support 65, to urge the pin 69 into contact with the end of plunger 74.

As best shown at Figure 5, sleeve 73 has an enlarged and apertured end which receives with a smooth fit the adjacent end of a drive shaft 82 having its enlarged ends formed as ellipsoids of revolution. A connecting pin 83 extends through a transverse hole in the enlarged end of the shaft and its projecting ends fit within axially-extending slots in sleeve 73, as clearly shown upon Figure 3. A ring 84 snaps into a circumferential groove in the end of sleeve 73 and holds the end of the shaft in place. The other end of shaft 82 projects within and is similarly coupled with a sleeve 85 attached to knob 57. Thus, for each rotation of knob 57 a fine pivotal adjustment of support 65 and the parts carried thereby, is effected, the movement per rotation depending upon the difference in pitch of the two screw threads. It will be noted that the pivot axis defined by pins 63 and 64 is, at all times, very nearly coplanar with the point of contact of pin 69 and plunger 74, in a plane normal to the tube axis 30b.

Referring to Figures 5 and 6, support 65 has a pair of vertically spaced lugs 86 and 87 at the left side thereof. These lugs have aligned holes, threaded to receive bearing pins 88 and 89 which may be identical with pins 63 and 64. A bracket 90 has parallel lugs 90a and 90b adapted to extend between lugs 86 and 87. Bearing balls 91 and 92 are received in the confronting conical recesses in lugs 86, 90a and 87, 90b, whereby the bracket 90 is mounted for smooth frictionless pivotal movement about an axis 93, Figure 6, normal to the axis of support 65, and the axis 30b. From Figures 3 and 4, it is seen that these two pivot axes are slightly offset along axis 30b.

From inspection of Figures 3 and 6, it will be noted that support 65 has a bore 94 in which a headed bushing 95 is secured by means of a nut 96. This bushing, as well as the parts connected therewith, may be duplicates of bushing 71 and the corresponding parts carried thereby. These have been previously described, so that it is deemed sufficient merely to point out, sleeve 97, plunger 98 and plate 99. An upstanding lug 90c on bracket 90, has a threaded aperture in alignment with plunger 98. A contact pin 100 is adjustably threaded into this aperture for engagement with the reduced end of plunger 98. Support 65 has a pair of threaded holes 101 and 102 on opposite sides of bore 94. Parallel guide pins 103 and 104 extend loosely through respective holes in bracket 90 and threadedly engage the apertures in support 65. The outer ends of these pins carry an abutment or cap 105. A coil spring 106, which may be a duplicate of springs 80 and 81, seats in cap 105 at one end and abuts against lug 90c at its other end, thus acting to firmly urge pin 100 into contact with plunger 98. From Figure 3, it is seen that the point of contact of pin 100 and plunger 98 lies in the plane through pivot axis 93, normal to range finder axis 30b. Sleeve 97 is connected by a shaft 107 for rotation by knob 58. Since this shaft, except for length, and its connection with sleeve 97 at one end, and knob 58 at the other, may be duplicates of shaft 82 and its connections, previously described, it is deemed unnecessary to repeat the description. When knob 57 is actuated to tilt support 65, as aforesaid, bushing 95, sleeve 97, etc., pivot as a unit therewith about the axis of pins 63 and 64. Thus, the separation of sleeve 97 from knob 58 is varied. The headed ends of shaft 107, such as 108, Figure 3, and its pin 109 in the slot of sleeve 110 attached to knob 58, permit the necessary relative movement between sleeve 97 and knob 58 while permitting the sleeve to be adjusted at all times without regard to the adjustment of knob 57. Bushing 95 and sleeve 97, on the one hand, and sleeve 97 and plunger 98, on the other, have screw threads of differential pitch so that a very fine adjustment is provided.

Thus, actuation of knob 57 pivots reflector 48 about an axis parallel with the line of sight while knob 58 operates to pivot the reflector about a second axis normal to the line of sight and the range finder axis. The adjustments are at all times entirely independent.

The bracket 90 is, of course, entirely open except for supporting and abutment rim portions along its bottom and one side edge, as indicated at 90d, Figure 4. A spring clip 111 is attached to the rim 90d and presses the reflector firmly into contact with a supporting protuberance 110. At the other side of the frame, a spring clip 112 acts to urge the reflector into contact with a pair of adjusting screws 113 only one of which is shown. These screws are spaced in the direction of extent of rim 90d and enable a very fine adjustment of the reflector relatively to its frame. A resilient clip 114 is mounted on the top of bracket 90 and engages the top edge of reflector 48, to urge its lower edge onto its seat on the lower rim of the bracket.

*The alternative mounting of the partial reflector*

In Figures 7, 8 and 9, I have shown an alternative mounting for partial reflector 48' corresponding to 48, Figure 4. In these figures, a ring gear 115 has teeth formed upon its inner and outer peripheries. Three radial arms 116 have their outer ends secured to gear 115. The hub 117a of an arcuate flanged track 117, is fixed to the inner ends of arms 116 with its axis in alignment with the axis of gear 115. Track 117 defines an arcuate path about an axis normal to and concurrent with, the axis of gear 115. Hub 117a is journaled in a portion of the range finder frame 118, Figure 9, and the gear, hub and track are rotated by a worm 119 fixed to the end of a shaft 120. This shaft is connected for operation by a knob 58' corresponding in all respects with knob 58, Figure 3. That is, rotation of knob 58' adjusts the reflector 48' about an axis normal both to axis 30b and to line of sight 66.

An arcuate slide 121 is shaped to fit track 117 with a smooth and accurate fit and carries arms 122 and 123 mounting a frame 124 for reflector 48', at their adjacent ends. Suitable means, not shown, are provided to maintain slide 121 in its guide track. The dimensions are such that the central axis about which slide 121 moves, passes approximately through the center of reflector 48'. The plane of the mirror lies on the axis of shaft 126, and at 45° to the common axis of curvature of track 117 and slide 121. Slide 121 is slotted as shown, one side edge of the slot being provided with teeth 125. A stub shaft 126 is journaled in and by hub 117a and at its upper end has fixed thereto a pinion 127 meshing with teeth 125. The sun gear 128 of a differential is fixed to the lower end of shaft 126.

A ring having worm teeth 129 is mounted beneath and concentric with ring gear 115, by means of a ball thrust bearing 130. The upper face of gear 129 has pivotally mounted thereon one or more pairs of intermeshing planetary pinions, three pairs being shown and identified by the numerals 131, 132 and 133. One pinion of each pair is in mesh with the internal teeth of ring gear 115 and the other of each pair is in mesh with sun gear 128. A worm 134' is fixed to shaft 135' and meshes with gear 129. Shaft 135' extends to the outside of the range finder casing where it carries a knob 57' corresponding in purpose and function to knob 57, Figure 3. Thus, as knob 57' is turned, gear 115 being assumed to be fixed, a drive takes place by way of worm 134', gear 129, planetary pinions 131, 132 and 133 and gear 128, shaft 126, pinion 127 and rack 125 to shift slide 121 relatively to track 117.

When knob 58' is turned, to rotate track 117 about the axis of shaft 126, shaft 135' being stationary, slide 121 would be erroneously shifted in the absence of the aforementioned differential because the slide "walks around" the then stationary pinion 127. With the differential constructed and connected as shown, rotation of shaft 120, shaft 135' being stationary, rotates track 117 in the manner previously described, and also drives sun gear 128 by way of pinion pairs 131, 132 and 133, to drive pinion 127 in the direction and amount necessary to maintain slide 121 motionless with respect to track 117. Thus the adjustments of the reflector 48' are about two mutually normal, concurrent axes while the two adjustments are entirely independent of each other, as in the species of Figures 3 to 6, inclusive.

*Geometrical optics of the range finder*

Rays from the target T, Figure 2, are totally reflected by entrance reflector 31 along the axis of casing 30 to, and through, partial reflector 48, and objective 134, to erecting prism 135. Thence the lines emerge downwardly and are reflected again parallel with the axis of the casing by prism 136 through reticle 45 and eyepiece lenses 56, 54 and 55, previously described. The ranging telescope thus provided is preferably 8-power with an 8-degree field of view. From Figure 4 or 5, it will be noted that the objective holder 138 has a flange 139 secured by screws 140 within an opening in frame 49. The holder projects axially through an opening 141 in support 65 so that the objective 134 lies in the plane transversely of the casing 30 through the axis defined by screws 63 and 64. It will also be noted from Figures 4 and 5, that prisms 135 and 136 are mounted on a projection 49a of frame 49, being clamped to the side of said projection by a plate 150, screws 151 and adjusting screws 152, threaded through plate 150.

Rays from the target T also enter opening 30c and fall on reflector 48. A portion of these rays are reflected through objective 134 to eyepiece 52, along the path just described and in superposed relation with the rays proceeding from reflector 31, and, of course, when the instrument is properly adjusted for range, the two images are exactly superposed. The manner in which the instrument is adjusted will be described under "Operation."

The remainder of the rays falling on reflector 48, pass directly therethrough to and through objective 142, thence through erector 143, shown as a conventional Porro prism system, to eyelens 144 and 145. The eyepiece for these lens is carried on the rear side of the finder casing, as identified at 146, Figures 1 and 10. Thus, the tracer observer or spotter at eyepiece 146, sees two crossed images of the tracer path forming a shallow curved X. The crossover or apparent intersection of the two images is the point at which the tracer passes through the range for which the range finder is set, as will be more fully described under "Operation." The spotting telescope thus provided is preferably six power with an 8-degree field of view covering the same field as the range finder proper. This field of view includes reticle circles with 1-, 2-, 3-, and 4-degree diameters concentric with the center of the field, as shown at 153, Figure 24.

A lamp 147, Figure 2, is positioned beneath range disc 42 and, when illuminated, causes an image of range line 43 and the range scale thereadjacent, to be projected onto a small prism 148, Figure 5, secured to the under side of prism 136. Thence the rays enter pentaprism 135 and are reflected through objective 134 and reflector 48 to reflector 33 carried by entrance reflector 31. The rays are then reflected back along the axis of casing 30 and reverted on passing through dove prism 149 carried by bracket 90 and moving as a unit with reflector 48. The rays then pass to eyepiece 52 through the small area defined by reticle mask 45a formed at one side on reticle 45. The image 43' is not shifted laterally when the cam 38 is turned. The radius to line 43 varies continuously with angular position on disc 42. Thus the portion of line 43 thru which rays from lamp 147 pass is shifted but due to the simultaneous movement of reflector 33 the image remains stationary. The finder is correctly adjusted, as previously described, when the line section falls between two fiducial marks on the reticle, as previously described in connection with Figure 23.

The altitude converter

On many target courses, the altitude remains substantially constant while, at the same time, slant range changes continuously. I take advantage of this fact to simplify the adjustments of the instrument by providing mechanism whereby the range finder operator sets in adjustments for altitude which are automatically converted to slant range. From the simple trigonometry involved, it is obvious that $$\sin \epsilon_0 = \frac{H_0}{D_0}$$

where $\epsilon_0$ is the angle of elevation above horizontal of the line of sight to the target, $H_0$ is the altitude, and $D_0$ is the slant range. This may be written $$D_0 \sin \epsilon_0 - H_0 = 0$$

which is the form in which the converter, now to be described, solves the equation.

Referring to Figure 17, it will be noted that sight shaft 7 has a gear segment 156 clamped thereon and in mesh with a pinion 157 fixed to the shaft 158 of elevation or "$\epsilon_0$" potentiometer 159. The winding of this potentiometer is tapered sinusoidally so that its slider 160, while rotated in accordance with the angle of elevation $\epsilon_0$ of the lines of sight, produces a voltage output proportional to $\sin \epsilon_0$. The actual circuits involving this potentiometer will be subsequently described in detail. Suffice it to say for the present that the circuit connections between this potentiometer and the converter parts carried by the range finder, are effected by leads carried in a cable 161, Figure 1, and having a conventional plug and receptacle at its ends. A cover 165 is secured to a base 164 to protect the parts carried thereby. This cover is removed in Figure 10.

The shaft 41 has been previously described as having disc 42 and range cam 38 fixed thereon. As shown in Figure 11, this shaft is directly connected with a coupling rod assembly 166 which extends upwardly through a protecting tube 167, Figure 1, through base 164, to the converter, where it is connected to shaft 168 of slant range potentiometer 169. Referring to Figures 10 and 12, shaft 168 has a reduced upper end to which a dielectric collar 170 is fixed. This collar has sliders 171 and 172 fixed to its upper and lower faces and which make contact, respectively, with inner and outer windings 173 and 174. As will be subsequently explained in detail, the outer winding 174 is the only one used in the converter circuit, the inner winding being used to transmit slant range electrically to the range servo in the director. The windings are wound upon dielectric forms secured respectively to the inner and outer surfaces of the core 175 integral with a base 175a and having a central bearing sleeve 175b. The core is mounted on plate or base 164, by supports 176.

A small reversible shaded pole motor 177 of about .003 H. P. is connected to drive as a unit the shaft 168 of potentiometer 169, the range disc 42 and cam 38. From Figure 10, it will be noted that this reduction drive includes a pinion 178 on the shaft of motor 177, and meshing with a gear 179 fixed to a jack shaft journaled in a frame 180 of the converter. A pinion 181 is fixed to the same shaft and drives a gear 182. This gear 182 is fixed upon a shaft 183 journaled in a bracket 184 bolted to frame 180. A pinion 185 is also fixed on shaft 183, between parallel, rearwardly-extending arms on bracket 184 and forming bearing supports for said shaft. Pinion 185 meshes with gear 186 formed as a unit with a bevel pinion 187, the two being fixed to a shaft 188, Figure 12. This shaft is journaled in a block 189 attached to frame 180. Pinion 187 drives pinion 190 fixed to shaft 191. This shaft is journaled in upright position by arms forming parts of block 189. A gear 192 is mounted between the aforesaid arms and is pinned to shaft 191.

Gear 192 meshes with a gear 193 forming one element of a slip friction coupling with shaft 168. Gear 193 is journaled on a hub 194 having a circular flange adapted to be received in a central depression on the under side of gear 193. This hub is connected with shaft 168 by a pin and slot arrangement indicated at 195. Three equally circumferentially spaced screws 196 project from the lower face of gear 193. A pressure plate 197 has apertures receiving screws 196 and coil springs 198 are mounted on each screw to exert a thrust between the head thereof and plate 197. Gear 193 being axially shiftable on hub 194, the flange of said hub is clamped between the gear and plate 197. The flange is faced with friction material so that shaft 168 and sliders 171 and 172, move as a unit with gear 193 under ordinary conditions. However, when the shaft 168 reaches the limits of its travel this slip connection prevents excessive torque from being exerted on the shaft by motor 177 and the inertia of the gears and other rotating parts.

As shown at Figure 10 and in detail at Figure 18, the motor 177 is provided with a flywheel 199 journaled upon motor shaft 177a. A spider 200 having a friction facing 200a, is pinned to shaft 177a on one side of the web of flywheel 199. A collar 201 is secured by set screw 202 to the end of the motor shaft. This collar has a reduced hub, splined to receive the splined opening of a second spider 203 which also has a friction facing. A coil spring 204 surrounds the hub portions of collar 201 and exerts a thrust urging spider 203 toward spider 200 to thereby clamp the flywheel web therebetween. As a result of this construction, there is a time lag between any change in rate or direction of rotation of the motor armature and flywheel 199 so that hunting is reduced and a smoother operation afforded. This is important because, as will subsequently appear, motor 177 may reverse rapidly in ordinary operation.

Base 164 carries a standard 205 on which are fixed three variable resistors 206, 207 and 208. These variable resistors have slides which are settable to vary the effective resistances thereof. Each is connected in the circuits as will be subsequently explained, so that the change in volts, per yard change in slant range, corresponds with the change in volts, per yard change of altitude. The connections to these resistors will be explained in the description of the electrical circuits.

It has been explained previously, that the range finder does not set slant range directly but rather, sets altitude, the latter value changing less rapidly than slant range under ordinary conditions of tracking. Referring to Figures 1 and 13, there is a box or casing 209 attached to the lower portion of the rear wall of director casing 5. An altitude potentiometer knob 210 is fixed to a shaft journaled in the right wall of this casing and has a pinion 211 on its inner end. Pinion 211 meshes with a gear 212 fixed to the shaft 213 of altitude potentiometer 214 having a slider 215. This potentiometer also appears in the wiring diagrams of Figures 19 and 21 and its electrical connections will be subsequently described. Suffice it to say for the present that the range finder operator, in looking into ocular 52, adjusts knob 210 and thereby unbalances a circuit which causes motor 177 to run in one direction or the other to thereby rotate cam 38 and pivot deflector 31. Adjustment is thereby effected to bring the two target images into coincidence. Whereupon, provided knobs 57 and 58 have been properly set, the range of the target may be read within mask 45 opposite an indicium at 47. The outer face of gear 212 bears an altitude scale visible through a window 216' in the end of casing 209, and readable against a fixed index (see Fig. 1). Switches 216 and 217 are mounted conveniently to knob 210, to control the range finder and director circuits, respectively. A knob 218 is positioned between the switches and is turnable to adjust the intensity of light emitted by lamp 147.

*The range servo mechanism*

The manner in which the range is determined, by turning knob 210 until motor 177 rotates cam 38 to bring the two target images into coincidence, has been explained. As motor 177 rotates to drive shaft 168, both sliders 171 and 172 of slant range potentiometer 169, are rotated in accordance with slant range. Outer winding 174 is used to develop a potential balancing the altitude converter circuit. Inside winding 173 is used to develop a potential, also proportional to slant range, for controlling the range servo mechanism which operates automatically to introduce slant range into the director.

The voltage set up by winding 173 is matched against a voltage proportional to the reading of the range dial of the director and any difference is used to control a servo-motor which automatically changes the range setting of the director, as well as the time of flight set into the computer.

The range servo potentiometer is identified at 219, Figures 13, 16 and 19 and includes a winding 220 mounted upon a base 222 and having a slider 221 secured to shaft 223. Shaft 223 is connected by a reduction drive, generally indicated by the numerals 224, for operation by range servomotor 225 which may be a capacitor start and run machine. Referring more particularly to Figure 16, this drive includes a pinion 226 on the shaft of motor 225 and meshing with a gear 227 fixed to countershaft 228 journaled in base 222. This shaft carries a pinion 229 driving a gear 230 fixed with gear 231 on second countershaft 232. Gear 231 drives a gear 233 attached to the potentiometer shaft. Gear 230 also meshes with a gear 234 fixed on range setting shaft 235. This is the shaft on which range handwheel 18, Figure 1, is mounted. This handwheel is removed when the coupled range finder and its controls are in operation. However, the handwheel may be used, when desired, to set in range, exactly as in the M5A1, M5 or M6 directors, merely by opening the director range switch 217, Figures 1 and 21. Motor 225 has a flywheel 236 which may be friction-coupled with the motor shaft as previously described for motor 177, in connection with Figure 18.

Referring to Figure 19, it will be noted that the inside winding 173 of slant range potentiometer 169, has a second potentiometer 237 so connected that adjustment thereof changes the voltage across both the inside winding 173 of the slant range potentiometer and the range servo potentiometer 219. This potentiometer 237 is shown at Figures 13 and 14, as mounted in the left end of box 209. A U-shaped bracket 238 is secured to the base 209a of box 209 and has a plate 239 secured inwardly of, parallel to and spaced from, its central or bight portion, as by means of spacers 240 and screws 241. A gear 242 is journaled in the space between plate 239 and bracket 238 and has secured thereto the cylindrical support 243 of potentiometer 237, as by means of screws 244. The core and winding of the potentiometer are secured on and externally of the support, as shown. The support has a central bearing 243a in which shaft 245 has a smooth fit. The slider 246 is secured to the inner end of shaft 245. A shaft 247 is journaled in aligned bearing apertures in plate 239 and the front wall of casing 209. This shaft carries a pinion 248 in mesh with gear 242. The end of the shaft projects to the exterior of box 209 where it carries a trial fire knob 249. In this manner, as the knob is rotated, gear 242 and the winding of the potentiometer are turned relatively to slider 246. This is intended only to introduce adjustments based upon trial shots.

A shaft 250 has one end counterbored to receive the projecting end of potentiometer shaft 245, the two being secured together by a set screw 251. The outer end of shaft 250 has an upstanding lever 254 secured in a diametrical slot in the shaft. This lever, as well as knob 249 are located conveniently to the left hand of the tracer observer as he looks into eyepiece 146. The vertical face of bracket 238 has a circular flange 238a outstanding therefrom, concentric of shaft 245. A radially inwardly projecting lug 238b forms a fixed abutment for a coil spring 252 located in the chamber formed by flange 238a and the inner coaxial end of shaft 250. This shaft has a lug 250a normally held in radial alignment with lug 238b by spring 252. The spring is held in place by a circular flange 250b fitting within flange 238a. Thus, lever 254 may be pivoted in one direction or the other against the action of spring 252, to move slider 246 over the winding of potentiometer 237. When the lever is released, the compressed spring acts to restore it to initial or center position in which the lugs 238b and 250a are in precise alignment.

From the hook-up of the potentiometer windings 173, 220 and 237, as disclosed in Figure 19, it will be apparent that the potentials across 173 and 219 are in opposition and that any difference is applied to an input of amplifier 255, subsequently described in detail. The range adjustment potentiometer 237, is effective to change the voltage across both the windings 173 and 220. This correspondingly changes the ratio of volts per yard, e. g., the calibration of the instrument and causes range servomotor 225 to change the range being set into the director so that it no longer coincides with the setting of the range finder. Hence the tracer observer may operate handle 254 in accordance with the observed crossover with respect to the target, of the two images of the tracer path in his field of view, to thereby increase or decrease the range setting of the director with respect to that being introduced by the range finder.

Under conditions wherein slider 246 is stationary, and the sliders 172 and 221 are at equal potential points on potentiometers 173 and 220 there is no input to amplifier 255, and motor 225 is at rest. When the voltages are unequal, the input to amplifier 255, will depend in phase upon the predominating voltage and in amplitude upon the voltage difference. The resulting amplified output causes motor 225 to turn in the direction necessary to so move slider 221 as to balance the voltage from line 267a to slider 221 with the voltage from line 267a to slider 172. As a result, motor 225 is turned proportionally to the range setting of the range finder, and its rotation may be used to set range into the director by way of gear 234 and shaft 235, in the manner previously described.

The electrical circuits

Figure 19 shows a simplified wiring diagram of the combined altitude converter and range servo circuits. Taking up first the altitude converter circuits, leads 256 and 257 including variable resistors 208 and 206, respectively, extend from the terminals 274 and 267 of a 115-volt, 60-cycle supply, to the corresponding terminals of outer winding 174 of the slant range potentiometer. Variable resistors 206 and 208 may have a rating of 10 watts and total resistances of 250 and 100 ohms, respectively. Corresponding leads 258 and 259, extend from the source to the terminals of the winding of altitude potentiometer 214. Lead 258 includes a variable resistor 260 of 10 watts and 500 ohms. Likewise, one terminal of the aforesaid source, is directly connected by lead 261 to a terminal of the winding of $\sin \epsilon_0$ potentiometer 159, the other terminal of 159 being connected over lead 262 to the slider 171 of winding 174. The sliders 160 and 215 of potentiometers 159 and 214, are connected by respective leads 263 and 264, to the input of one section of amplifier 255. By the connections shown, the voltage from slant range winding 174 is impressed on $\sin \epsilon_0$ potentiometer 159 so that a voltage proportional to $D_0 \sin \epsilon_0$ is obtained. As shown, this voltage is connected in series with the voltage from altitude potentiometer 214, the connections being made so that one voltage is subtracted from the other and any difference fed to the corresponding section of amplifier 255 having its output connected by leads 265 and 266 to control motor 177. The phase of the voltage fed to amplifier 255 will depend upon the predominating one of the algebraically added voltages and the motor 177 will rotate in a direction depending upon the phase of the amplified algebraic sum. Thus, when altitude slider 215 is manually adjusted by knob 210, the previously balanced circuit is unbalanced and a net voltage is fed to amplifier 255 whose phase will depend upon the direction in which the slider is adjusted and whose amplitude will depend upon the amount of adjustment of the slider. Motor 177 will then rotate and, through the previously-described speed-reducing drive, rotate slider 171 in the direction necessary to again balance the opposed voltages. At the same time motor 177 rotates cam 38 of the range finder and pivots entrance reflector 31.

The range finder operator, then, while looking into eyepiece 52, adjusts knob 210 and, in so doing, causes the operation of motor 177 in the direction and amount necessary to bring into coincidence the two images of the target as reflected from respective reflectors 31 and 48. When coincidence has been effected, the range may be read within reticle mask 45a and, by the range servo mechanism, is introduced into the director. It will be noted that the range finder operator does not directly set range, but altitude, which may be read at window 216', Figure 1. Since, for many target courses, altitude changes but slowly, while at the same time, range may be changing rapidly, the invention gives the operator a much more precise and sensitive control than would be the case were he required to set range directly. Furthermore, he is enabled to effect range adjustments more rapidly and is enabled, with relative ease, to maintain the range finder properly adjusted for rapid changes of range.

By the construction previously described in connection with Figure 10, motor 177 operates to adjust slider 172 of inside winding 173 of the slant range potentiometer, the drive being indicated by dotted line 168, Figure 19. One lead 267a of a 115 volt, 60-cycle source, connects through resistor 207, with one terminal of winding 173. The remaining terminal is connected by lead 268, through variable resistor 269 of 10 watts and 150 ohms, with one terminal of the winding of range adjustment potentiometer 237. The slider 172 of winding 173 is connected by a lead 270 with one input terminal of a second section of amplifier 255. Lead 237a is also connected, through a variable resistor 271' of 10 watts and 100 ohms, with one terminal of the winding 220 of range servo potentiometer 219. The two remaining terminals of windings 220 and 237, are directly connected by a lead 271. The slider 221 of range servo potentiometer 219, is connected by a lead 272 to the other input terminal of the second section of the amplifier. The slider 246 of range adjustment potentiometer 237 is connected through variable resistor 273 of 10 watts and 300 ohms and a lead 274a, with the remaining terminal of the current supply. Actually, as will appear from Figures 21 and 22, all current supply is from one and the same source, the connections having been omitted in Figure 19 to avoid confusion. This fact is indicated by the use of the reference characters 267, 274, 267a, 274a, etc., upon Figure 19.

From the hook-up disclosed, it will be clear that range adjustment potentiometer is so connected that varying it changes the voltage across both the winding 173 of slant range potentiometer 169, and winding 220 of range servo potentiometer 219. It will also be clear that the voltage from line 267a to slider 221 is matched or balanced against that from line 267a to slider 172 so that any difference between the two, is fed to the input of the second section of amplifier 255 over leads 270 and 272 and, after amplification, applied to motor 225 to cause the same to operate in a direction and at a speed depending, respectively, upon the phase and amplitude of the resultant voltage. The manner in which the amplifier operates will be subsequently described. Motor 225, being connected to slider 221 by way of drive 224, previously described, adjusts potentiometer 219 to balance the two voltages and bring their difference to zero. At the same time, as previously described, motor 225 acts to introduce range into the director. The range so set is continuously indicated by dial 19.

The parts are so arranged that the range spotter, looking into eyepiece 146, has lever 254 convenient to his left hand. It will be recalled that this lever is connected to adjust slider 246 of the range adjustment potentiometer. Such adjustment unbalances the circuit so that motor 225 must run in a direction depending upon the direction of adjustment of slider 246, to move slider 221 to a new position for balanced voltages. As a result, a range is set into the director which is greater or less than that determined by the range finder. The correction, of course, is based upon the spotter's observations of the tracer crossovers with respect to the target. One lead 267b extends from the source of A. C. to a center tap on motor 225 while the remaining lead 274b from said source, extends to one of three output terminals of the second section of amplifier 255. The remaining two terminals of motor 225 are connected by leads 275 and 276 with the two remaining output terminals of the second section of the amplifier. The action is smooth, continuous and without appreciable time lag. Hunting of motors 177 and 255 is reduced to a minimum so that a delicate and substantially instantaneous response is obtained to manual adjustments of sliders 215 and 246. The range thus introduced into the director is that determined by the range finder, plus or minus any corrections effected by slider 246. The field coils of motor 177 are supplied from leads 237c and 274c.

Figure 21 shows the circuit connections for the parts carried within box 209. A terminal block 277, indicated in dotted lines upon this figure, is mounted within the director casing. The terminals of this block are identified by capital letters. Each terminal is connected with its correspondingly identified pole of a 12-pole plug schematically identified at 278, which is adapted to be connected by a 12-wire cable having receptacles at its ends, with a plug on the amplifier and schematically shown at 279, Figure 22. The bundle of leads from the various connections in box 209, pass to the amplifier in director casing 5, through cable connector 280, Figure 13. From terminal block 277, Figure 21, appropriate leads extend to a 9-pole receptacle 163a, adapted to receive plug 163 (see Figure 1). Referring to Figure 20, the various leads from the parts of the altitude converter disposed on base 164 on range finder 27, are carried through fitting 162a and flexible cable 161 to plug 163 in a conventional manner. For ease of understanding, the various poles leading to receptacle 163a, Figure 21, and from plug 163, Figure 20, have been given the same, lower-case letters as have been used to identify the corresponding poles on block 277 and plug 278. Since the same reference characters have been used upon Figure 21 as were used to identify corresponding parts on Figure 19, it is deemed sufficient merely to describe those parts on Figure 21 which do not appear in Figure 19.

Referring to Figure 21 and master terminal block 277, it will be understood from previous description that poles A and B, are connected with the source of A. C. supply. Pole C is connected by lead 281 with one terminal of range scale light rheostat 218a, whose operating knob 218 has been previously mentioned and appears upon Figure 1. From rheostat 218a, lead 282 extends by way of pole E to lamp 147, return being by way of lead 283, and poles d and D. Poles C and D are connected through plug 278 to a source of reduced voltage. Thus, by actuating knob 218, lamp 147 may be turned on and off and the intensity of illumination of range scale disc 42, may be varied to suit the conditions of ambient light. A. C. current is supplied to the altitude converter from pole A and lead 267, to one terminal of range finder switch 216 (see Figure 1 also), thence over lead 267c to pole f, return being by way of pole b and lead 274c to pole B. Pole G connects one input of the second section of the amplifier, with slider 172 of slant range potentiometer, by way of lead 270. Pole H connects the other input terminal of said amplifier section, by way of lead 272, with slider 221 of potentiometer 219. Poles J and K are connected by leads 265 and 266, respectively, between the output terminals of the first section of amplifier 255 and the poles of motor 177. Poles L and M are connected over leads 275 and 276, between two output terminals of the second section of amplifier 255 and two terminals of range servo motor 225. The third motor terminal is connected by lead 267b, through director range switch 217, and range finder switch 216, to A. C. supply at pole A. Thus both switches must be closed for energization of motor 225 as well as for potentiometers 219 and 237. Lead 268a, Figure 20, extends from one terminal of inside winding 173 of slant range potentiometer 169, by way of poles n, N, lead 268, resistor 269 to potentiometer 237. A lead 262a, extends from the slider 171, by way of poles p, lead 262 and pole P to one terminal of the winding of potentiometer 159. Since both potentiometer 159 and amplifier 255 are positioned within the director casing, no pole is provided for lead 263 between slider 160 and the amplifier input, the connection being made directly. Still referring to Figure 20, the two terminals of winding 174, are directly connected by lead 256 and resistor 208, and by lead 257 and resistor 206, to the terminals of motor 177, which are connected to the A. C. source from poles A and B.

*The amplifier*

Amplifier 255 is provided to supply sufficient power to operate the motors under control of the small potential differences created as a result of unbalance in the circuits, previously mentioned. The two sections of this amplifier have been previously mentioned and, in effect, the two sections are separate and distinct, one being controlled by unbalanced potentials in the altitude converter circuit and, in turn controlling motor 177, the other being controlled by potential differences in the range servo and, in turn controlling motor 225.

Referring to Figure 22, the 12-pole plug 279 of the amplifier, has previously been described. Corresponding lettered poles of these plugs are connected by 12-wire cable having receptacles at its ends. Of these the wires connected between poles A and B are tapped to the A. C. supply at the director terminal block. Also the wire connecting poles A is tapped to one winding terminal of sine $\epsilon_0$ potentiometer 159, to make the direct connection shown at Figure 19. The wire of the aforesaid cable, not shown, connecting poles P is cut intermediate its ends, to form two terminals. One terminal is connected to the remaining terminal of potentiometer 159 and the other to the slider 160, thereof.

Referring to block 279, Figure 22, a lead 267d connects pole A with the primary of a transformer 285, return being through lead 274d to pole B. One secondary winding 285a supplies filament current to the tubes and also supplies current to range finder lamp 147 over leads 281a and 283a, connected with poles C and D, respectively. Poles P and Q constitute the input terminals of the first section of the amplifier. Pole P which, it will be recalled, is connected over lead 253, Figure 19, with slider 160, is grounded through a 200 ohm resistor 286 and the primary of a transformer 287, in parallel. Input pole Q is connected by lead 264 with the control grid of a triple-grid detector 288 having its suppressor and cathode grounded through the 500 ohm resistor 289 and 25 mf. condenser 290, in parallel. Tube 288 may be a 6SJ7GT. The secondary of transformer 287 has one terminal connected by way of lead 265 and poles J and j, with motor 177, as previously described, the other transformer terminal being grounded. The plate of tube 288 is connected in the manner shown, Figure 22, through condenser 292 with a beam power amplifier 291, which may be a 6L6G. The plate to grid connection includes a filter of .05 mf., grounded through resistor 293 of 250,000 ohms. Screen voltage is supplied to the tubes from transformer 285, through a resistance 294 of 500 ohms and 20 w., in connection with a plug-in type electrolytic condenser 295. The resistor 296 is of 400,000 ohms and condenser 297 of .25 mf. Bypass resistor 298 is 100,000 ohms. The suppressor and cathode of tube 291 are connected to ground through a bias resistor 299 of 250 ohms and 10 w. and a capacitance 300 of 25 mf. Screen voltage is supplied through a resistor 301 of 10,000 ohms. The output is by way of lead 266 and poles K and k to motor 177 as previously described. A condenser 302 of 8 mf. is used, together with a choke-condenser output coupling device consisting of a 1 mf. condenser 303 and a choke 304 having an inductance of about 10 henrys.

The foregoing described elements constitute the first section of the amplifier and its operation will be obvious. Any potential applied over leads 263 and 264 will be proportional to the difference of potentials between the product of the potentials of windings 174 and 159 on the one hand, and the corresponding potetnials of winding 214, on the other hand. The difference will vary in phase, depending upon which of the two algebraically-added potentials predominates. The amplified output is impressed directly across the shading windings of motor 177 which will rotate in a direction corresponding to the phase of the amplified output. The connections are such that the resulting rotation adjusts slider 171 to reduce the potential difference to zero.

The input to the second section of amplifier 255 includes lead 270 from the slider 172, which is fixed to the same shaft with slider 171, and lead 272 connected with the slider 221 of range servo potentiometer 219. The inputs are connected to the primary of transformer 305. One terminal of the secondary of transformer 305, is connected directly, by lead 306 with the primary of a transformer 307, which may be a duplicate of transformer 287. The other primary terminal is grounded. One terminal of the secondary of transformer 307 is directly connected by lead 275 and poles L with motor 225. The other secondary terminal is connected by lead 276 and poles M with a second or reversing terminal of said motor.

The remaining secondary terminal of transformer 305 is connected to the grids of a twin triode 308 such as a 6N7GT having its one plate connected by lead 309 with the coil of a plug-in relay 310 and its other plate connected by lead 311 with the coil of a second plug-in relay 312. The cathode is connected to ground through a condenser 313 of 10 mf. in parallel with a variable resistor 314 of 5,000 ohms maximum. The remaining terminals of relay coils 310 and 312, are connected over leads 315 and 316, respectively, with the end taps of main secondary winding of transformer 285, and with the plates of a full wave rectifier 319, which may be a 5U4-G having its filament supplied from special taps on transformer 285. Condenser 317 and 318 of .5 mf. each are shunted across the respective relay coils.

The common terminal of the relay armatures are connected with pole B of A. C. supply over lead 320. The contact of relay 310 is connected with lead 275, while that of 312 is connected with lead 276. A condenser 321 of 4 mf. is connected across these contacts.

The operation of the second amplifier section will be clear from the foregoing description. Any potential difference between that of winding 173 and the potentials of potentiometer 219, as modified by potentiometer 237, is applied by leads 270 and 272 to transformer 305. Depending upon the phase of the resultant or differential voltage, relay 310 or 312 will be energized. When relay 310 is energized, a circuit through motor 225 is closed which extends from A. C. supply by way of pole B, lead 320, relay 310, lead 275, to motor 225, and return by way of lead 267b, switches 217 and 216, lead 267 and pole A to the other terminal of A. C. supply. On the other hand, when the amplified potential difference is of opposite phase, relay 312 is energized and a circuit through motor 225 is closed by way of lead 320, relay 312, lead 276 and poles M, to the reverse coil of motor 225. Return is by way of common lead 267b, as previously traced. Motor 225, thus energized, turns in a corresponding direction to adjust slider 221 until the potential difference is reduced to zero.

Switches 216 and 217, by the connections shown, may be used to turn off either of motors 177 or 225. In event of failure of the range servo mechanism, director range switch 217 is opened. The handwheel 18 is then mounted upon shaft 235, whereupon, range may be set into the director in the same manner as an M5 or M6 director. Or, if the range finder is still operative, the range finder operator can call out the range so that it may be set into the director by handwheel 18.

*Operation*

The director forming the subject matter of my invention requires four operators, namely, (1) an azimuth tracker, (2) an elevation tracker, (3) a range finder operator and (4) a tracer observer and range spotter. The duties of the trackers are clear from previous description. Each, while looking into his telescope, operates his hand wheel to keep the cross hair in his telescope on the target. In so doing, the director is turned about a vertical axis and shaft 7 about a horizontal axis, to keep the parallel lines of sight on the target. Operation of handwheel 13 also adjusts slider 160 to produce a voltage proportional to sin $\epsilon_0$. The range finder operator looks through ocular 52 and is responsible for three adjustments, namely, those effected by knobs 57, 58 and 210.

In setting knob 58, the knob 218 is turned to adjust rheostat 218a until lamp 147 renders the range scale readily visible in mask 45a. Knob 58 is then turned to thereby adjust reflector 48 until the range line 43 is centered between the two fiducial marks 47. This setting must be maintained during operation and acts to correctly calibrate the range finder. Moving knob 57 acts in the manner previously described, to shift one target image relatively to the other in a direction normal to the line of sight and the axis of the tube, to bring the two into coincidence. Figure 23 shows a typical view when both knobs 57 and 58 have been correctly set. In addition the range finder operator adjusts knob 210. This acts to adjust slider 215 of altitude potentiometer, to control motor 177 and thereby cam 38 and reflector 31, in the manner previously described. Adjustments are thus effected until the two-target images coincide and, when these adjustments are maintained, the instantaneous range appears within mask 45 opposite the indicated center of fiducial mark 47. Because of the fact that altitude is set into the range finder, instead of range, the task of the operator is greatly reduced while, at the same time, the accuracy is increased.

The tracer observer, in looking through ocular 146, sees the target and two images of the path of the tracers which appear to cross at a point C to form a shallow curved X. Since the range finder is being set to the range of the target, the crossover of the two images indicates the position of the tracer at the range of the target. By noting the position of this crossover C and its relation to the target, the observer can tell, to a high degree of accuracy whether the lead is too great or too small. The observer keeps his left hand upon lever 254 and, noting whether the lead is too great or too small along the path of the target, adjusts the lever in a corresponding direction to thereby increase or decrease the range being set into the director, in the manner previously described.

Figure 27:
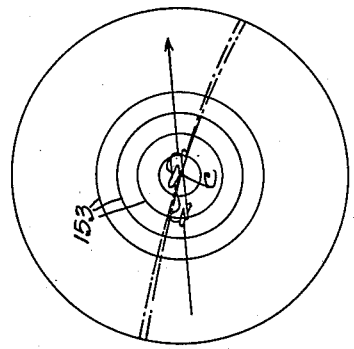
Figure 30:
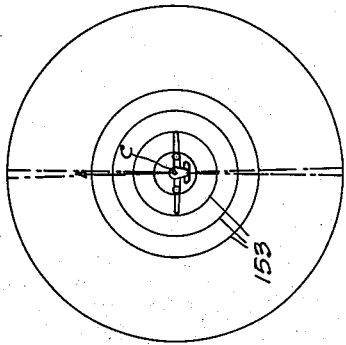
Figure 26:
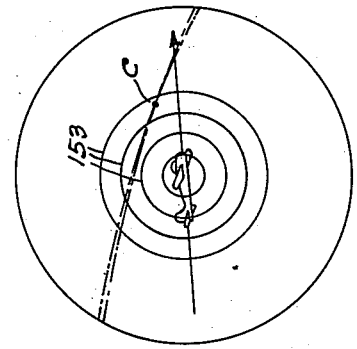
Figure 29:
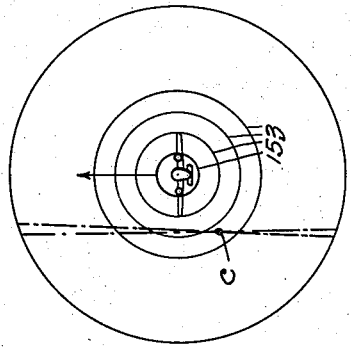
Figure 25:
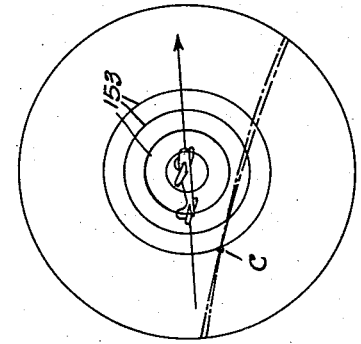
Figure 28:
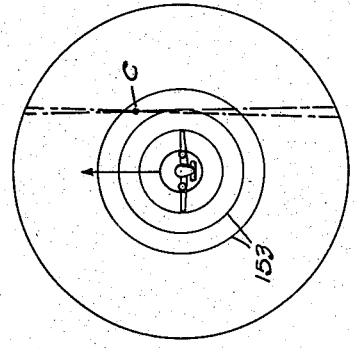

Figures 25 to 30, inclusive, show typical views of a target and tracer path images as they appear to the observer at ocular 146. Since the observer corrects lead by adjusting range, he can correct only along the line of sight. Corrections transversely of the line of sight must be effected by the elevation tracker for an incoming or outgoing course, and by the azimuth tracker for a cross-course, or by both for a target course having elevation and azimuth components transversely of the line of sight. Figures 25, 26 and 27, show crossing target courses. Figures 28, 29 and 30, show incoming courses.

In Figure 25 the tracer crossover C is below and behind the target. The range must be increased and the elevation tracker must "track high," that is, increase the elevation of his reticle relatively to the target. In Figure 26 the crossover is ahead of and above the target. Correction must be made by decreasing the range setting of the director, while the elevation tracker must "track low." In Figure 27 the crossover is accurately "on target" and no adjustments are required. Figure 28 shows the target on an incoming course with the crossover ahead and to the right of the target. The tracer observer must decrease the range setting and the azimuth tracker must track to the left. In Figure 29 the crossover is behind and to the left of the target. Here the observer must increase range while the azimuth tracker must track more to the right. In Figure 30 all adjustments have been correctly made and no changes are required.

While I have shown the form of the invention as now preferred, numerous modifications, substitutions and rearrangements will occur to those skilled in this art after a study of the present disclosure. Furthermore, it will be obvious that, while all parts described cooperate to produce a new and useful result, certain portions of the invention are useful in other relations than the ones disclosed. Hence, the foregoing description should be taken in an illustrative, rather than a limiting sense; and it is my intention and desire to reserve all such changes and modifications as fall within the scope of the subjoined claims.

Having now fully disclosed my invention, what I claim and desire to secure by Letters Patent is:

1. In a range finder of the fixed base type, a generally tubular casing having first and second entrance openings in its opposite ends and a central longitudinal axis, a reflector pivoted in said casing adjacent said first opening to determine a first line of sight therethrough to a remote object and pivoted about a first axis normal to said longitudinal axis, a frame fixed in said casing, a support mounted in said frame adjacent said second opening for pivotal movement about a second axis substantially perpendicular to said longitudinal axis and parallel to the line of sight to the remote object through said second entrance opening, a partial reflector, bracket means mounting said partial reflector in said support for pivotal movement about a third axis substantially parallel to said first axis, a first plunger threadedly engaging said frame and contacting said support at a point offset from said second axis, a second plunger threadedly engaging said support and contacting said bracket means at a point offset from said third axis, means resiliently urging said support and said bracket means into contact with said first and second plungers, respectively, and means carried by said casing and operable exteriorly thereof for individually and selectively turning said plungers to angularly adjust said partial reflector about said second and third axes, respectively.

2. In a range finder having a central normally horizontal axis and entrance reflectors spaced along and pivotable about parallel axes normal to said central axis, first means for pivoting said finder about an axis parallel to said central axis to determine a line of sight to a target, second means adjustable to relatively pivot said reflectors to determine the range to said target along said line, third means responsive to said first means for producing a first voltage proportional to the sine of the angle of elevation of said line relatively to the horizontal, fourth means responsive to the range adjustment of said second means for producing a second voltage proportional to the range setting, fifth means combining said first and second voltages to produce a third resultant voltage proportional to their product, manually operable means to produce a fourth voltage proportional to altitude of said target, power means connected to drive said second means, and means feeding any difference in said third and fourth voltages to said power means to operate the same and vary the setting of said second means to thereby balance said third and fourth voltages.

3. In an optical range finder rotatable about normally vertical and horizontal axes to establish a line of sight to a target, said range finder including optical elements adjustable to determine the distance to said target along said line, a motor connected to adjust said elements, a first potentiometer adjusted by said motor to establish a first potential proportional to the adjustment of said elements and hence proportional to slant range, a second potentiometer means responsive to rotation of said range finder about its horizontal axis in accordance with the angle of elevation of said line of sight to establish a second potential proportional to the sine of said angle, a third potentiometer manually settable in accordance with the altitude of said target and effective to establish a third potential proportional to the setting thereof, circuit means combining said first and second potentials to establish a resultant potential proportional to the product of said first and second potentials, and subtracting said third potential from said resultant potential to establish a final potential, and means responsive to the phase and amplitude of said final potential for controlling the direction and rate of rotation respectively of said motor.

4. A fixed base range finder having first and second entrance reflectors relatively adjustable about spaced parallel axes to determine range, a motor on said range finder connected to adjust said first reflector in accordance with range, a potentiometer adjustable by said motor to develop a first potential proportional to range, a second potentiometer adjustable to develop a second potential proportional to the sine of the angle of elevation of the line of sight of said range finder, circuit means combining said first and second potentials to establish a resultant potential proportional to their product, a third potentiometer manually adjustable to develop a third potential, circuit means controlling said motor in response to any difference in said resultant and third potentials to equalize the same and adjust said first reflector, and follow-up means responsive to operation of said motor to set range into a director.

5. In a gun fire director having an element settable in accordance with range, a range servo motor connected to said element to set the same, a first slant range potentiometer winding, a second servo potentiometer winding and a third manually adjustable potentiometer winding, a lead connecting one terminal of a source of A. C. with one terminal each of said first and second windings, a lead connecting the other terminal of said A. C. source with the slider of said third potentiometer winding, a lead connecting the remaining terminal of said first winding with one terminal of said third winding, a lead connecting the remaining terminals of said second and third windings, an amplifier, leads connecting the input of said amplifier with the sliders of said first and second windings, respectively, circuit means connecting the output of said amplifier with said motor to control the same, an electric motor connected to drive the slider of said first winding in accordance with range of a target, an optical range finder, and a driving connection between said range servo motor, range finder and the slider of said second winding.

6. The combination with a gun fire lead computer having sight means rotatable about normally vertical and horizontal axes to establish a line of sight to a target and having a first part settable in accordance with the range of said target along said line, an optical range finder carried by said computer and movable therewith to establish a second line of sight to said target, said range finder having an optical part adjustable to determine the range to said target, a first potentiometer, a first motor driving said optical part and said first potentiometer to thereby adjust said range finder for range, a second potentiometer adjusted by said sight means in accordance with the angle of elevation of said line of sight, to establish a potential proportional to the sine of said angle, a third potentiometer manually adjustable in accordance with the altitude of said target, an amplifier, circuit means combining the voltages of said first and second potentiometers to provide a resultant voltage proportional to their product, and energizing said amplifier in accordance with any difference between said resultant voltage and the voltage established by said third potentiometer, circuit means including the output of amplifier and controlling said first motor in direction and speed of rotation, and servo motor means controlled by said first motor to drive said first part.

7. In combination with a gun fire director having means to compute the angles of lead for firing upon a moving target and including a range set, a range finder mounted on said director and movable angularly therewith to track said target, said range finder including an adjustable range cam, a first potentiometer having first and second windings, a first follow-up motor connected to simultaneously adjust said cam and potentiometer in accordance with slant range, a second potentiometer operable to establish a voltage proportional to the sine of the angle of elevation of a line to said target, said first winding and second potentiometer being connected to provide a first resultant voltage proportional to their product, a third potentiometer manually adjustable to establish a second voltage proportional to altitude of said target, first circuit means combining said first and second voltages and including an amplifier energizing said first motor in accordance with the phase and amplitude of the combined voltage, a second follow-up motor, a range servo potentiometer, circuit means connecting said second winding and range potentiometer in opposition to establish a second resultant voltage, second circuit means including an amplifier operating said second motor in accordance with the phase and amplitude of said second resultant voltage, and means connecting said second motor to drive said range set.

8. The combination as recited in claim 7, a range adjustment potentiometer included in said second circuit means and manually operable to unbalance said circuit means to operate said motor and modify the range setting of said director in accordance with spotter's correction.

9. In a fixed base range finder, an elongated casing having a central longitudinal axis, first and second entrance reflectors mounted in respective ends of said casing for pivotal movement about parallel first and second axes normal to said central axis and lying in the respective reflecting surfaces of said reflectors, said second reflector being partially reflecting, a first eyepiece carried at the end of said casing adjacent said second reflector, a disc rotatably mounted in said casing and having a spiral range line and range scale thereon, a spiral cam fixed with said disc for rotation therewith, a lever fixed to said first reflector and extending axially in said casing with its free end bearing on said cam, means yieldingly urging said lever into contact with said cam, first optical means reflecting into a common field of view in said first eyepiece, superposed images of a remote object as reflected by said entrance reflectors and an image of correlated portion of said line and scale, a second eyepiece carried by said casing, second optical means reflecting into said second eyepiece superposed images of said object proceeding (1) from said first and second entrance reflectors and (2) directly through said second entrance reflector, power means connected to rotate said disc and cam, first and second concentric potentiometer windings having respective contact arms, a driving connection between said power means and contact arms, and means under control of an observer at said first eyepiece to control the operation of said power means.

10. In an optical range finder of the fixed base coincidence type, an elongated casing mounted for pivotal movement about the normally horizontal longitudinal axis of said casing, first and second entrance reflectors mounted in the respective ends of said casing for receiving rays from a common target, means to pivot one said reflector in adjusting said range finder to determine the range of a target, said means including a shaft, first potentiometer means operated by said shaft to produce a first A. C. potential proportional to slant range, second potentiometer means responsive to pivotal movement of said elongated casing about its longitudinal axis in following the target, to produce a second A. C. potential proportional to the sine of the angle of elevation of the line of sight of said range finder to the target, third potentiometer means manually operable in accordance with height of the target, circuit means, connecting all said potentiometer means to multiply said first and second potentials and algebraically add said third potential to produce a resultant potential, and a servo-motor responsive in direction of rotation and speed to the phase and amplitude, respectively, of said resultant potential.

11. An optical range finder comprising an optical element defining a line of sight to a target, a part operable to adjust said element to determine the range of a remote target, a first potentiometer connected for adjustment synchronously with said part to establish a first potential proportional to the slant range of the target, a reversible A. C. motor connected to operate said part and first potentiometer, a second potentiometer adjustable by said range finder in accordance with the angle of elevation of the line therefrom to the target as the line of sight thereof is maintained upon the target, to establish a second potential proportional to the sine of said angle, a third manually adjustable potentiometer, an amplifier, circuit means interconnecting said potentiometers, the input of said amplifier and a source of A. C. voltage to energize said amplifier in phase and amplitude, by a potential equal to the instantaneous difference between the product of the potentials established by said first and second potentiometers and the potential established by said third potentiometer, and circuit means connecting the output of said amplifier with said motor to control the direction and speed of operation of said motor to thereby operate said part and optical element in response to manual adjustment of said third potentiometer.

12. In a director, a casing, mechanism carried by said casing for computing the elevation and deflection angles for firing upon a moving target, said mechanism including an element settable in accordance with slant range of the target from the director, an optical range finder journaled on said casing for pivotal movement about an axis normal to the line from director to target, said range finder including a part operable to adjust said finder to determine the range of the target, a first potentiometer connected for adjustment synchronously with said part to establish a first potential proportional to the slant range of the target, a reversible A. C. motor connected to operate said range finder part and first potentiometer, a second potentiometer adjustable by said range finder in accordance with the angle of elevation of the director-target line to establish a second potential proportional to the sine of said angle of elevation, a third and manually adjustable potentiometer, a first amplifier, circuit means interconnecting said first, second and third potentiometers, said first amplifier and a source of A. C. voltage, to energize said amplifier in phase and amplitude, by a potential equal to the instantaneous difference between the product of the potentials established by said first and second potentiometers and the potential established by said third potentiometer, circuit means connecting the output of said amplifier with said motor to control the direction and speed of operation of said motor to thereby operate said part in response to manual adjustment of said third potentiometer, a fourth potentiometer connected for synchronous adjustment with said first potentiometer, a fifth potentiometer, a range servo-motor connected to synchronously adjust said element of the director and fifth potentiometer, a sixth and manually adjustable potentiometer, a second amplifier, second circuit means connecting said fourth, fifth and sixth potentiometers and the input of said second amplifier with a source of A. C. voltage, to energize said second amplifier in phase and amplitude by a potential equal to the difference between the potential established by said fifth potentiometer and the combined potentials established by said fourth and sixth potentiometers, and circuit means connecting the output of said second amplifier with said servo-motor.

DUNCAN J. STEWART.

REFERENCES CITED

The following references are of record in the file of this patent:

UNITED STATES PATENTS

| Number | Name | Date |
|---|---|---|
| 1,695,483 | Dawson et al. | Dec. 18, 1928 |
| 1,968,002 | Nowicki et al. | July 24, 1934 |
| 1,974,864 | Fletcher | Sept. 25, 1934 |
| 2,235,826 | Chaffee | Mar. 25, 1941 |
| 2,317,419 | Taylor et al. | Apr. 27, 1943 |
| 2,388,509 | Trotter | Nov. 6, 1945 |
| 2,399,726 | Doyle et al. | May 7, 1946 |
| 2,401,696 | MacNeille | June 4, 1946 |
| 2,401,700 | Mihalyi | June 4, 1946 |
| 2,401,704 | Mihalyi | June 4, 1946 |
| 2,401,706 | Mihalyi | June 4, 1946 |
| 2,403,737 | Mihalyi | July 9, 1946 |
| 2,403,738 | Mihalyi | July 9, 1946 |
| 2,426,658 | Wooldridge | Sept. 2, 1947 |
| 2,439,381 | Darlington | Apr. 13, 1948 |
| 2,458,448 | Tuttle | Jan. 4, 1949 |
| 2,459,206 | Wheeler | Jan. 18, 1949 |